US006476908B1

(12) United States Patent
Watson

(10) Patent No.: US 6,476,908 B1
(45) Date of Patent: Nov. 5, 2002

(54) OPTICAL PROBE

(75) Inventor: Mathew D. Watson, Bellevue, WA (US)

(73) Assignee: Eclipse Optics, Inc., Bellevue, WA (US)

( * ) Notice: Subject to any disclaimer, the term of this patent is extended or adjusted under 35 U.S.C. 154(b) by 0 days.

(21) Appl. No.: 09/546,046

(22) Filed: Apr. 10, 2000

(51) Int. Cl.[7] .................................................. G01J 1/60
(52) U.S. Cl. ...................................................... 356/214
(58) Field of Search ................................ 356/213, 214, 356/218, 225, 226, 227

(56) References Cited

U.S. PATENT DOCUMENTS

| | | | |
|---|---|---|---|
| 3,282,178 A | 11/1966 | Nelson | 95/10 |
| 4,035,088 A | 7/1977 | Jenkins et al. | 356/218 |
| 4,511,250 A | 4/1985 | Olsen | 356/225 |
| 4,772,124 A | 9/1988 | Wooten et al. | 356/218 |
| 5,469,252 A | * 11/1995 | Doles et al. | 356/73.1 |
| 5,523,837 A | 6/1996 | Prozzo | 356/121 |
| 5,880,836 A | 3/1999 | Lönnqvist | 356/336 |
| 5,905,571 A | * 5/1999 | Butler et al. | 356/328 |
| 6,301,001 B1 | * 10/2001 | Unno | 355/67 |

FOREIGN PATENT DOCUMENTS

| | | |
|---|---|---|
| DE | 32 32 508 A1 | 3/1984 |
| FR | 1.470.753 | 2/1967 |

OTHER PUBLICATIONS

Lin, L.Y., et al., "Microactuated Micro–XYZ Stages for Free–Space Micro–Optical Bench," *Micro Electro Mechanical Systems*, 1997, pp. 379–384.

Ming, L.F., et al., "Self–Assembled Microactuated XYZ Stages for Optical Scanning and Alignment," *Transducers '97 International Conference on Solid–State Sensors and Actuators*, vol. 1, 1997, pp. 424–427.

Butler, J.T., et al., "Scanning and Rotating Micromirrors Using Thermal Actuators," *Optical Scanning Systems: Design and Applications*, L. Beiser et al., Eds., Proc. SPIE, vol. 3131, 1997, pp. 404–414.

(List continued on next page.)

*Primary Examiner*—Michael P. Stafira
(74) *Attorney, Agent, or Firm*—Christensen O'Connor Johnson Kindness PLLC

(57) ABSTRACT

An optical probe for measuring the intensity and/or intensity distribution in a light beam is provided. The optical probe (10) includes a substrate formed of nonlight-absorbing material and a light-scattering element (12) included in the substrate. The light-scattering element has an index of refraction different from that of the substrate. The optical probe further includes an aperture stop (14) for receiving the light (16') scattered by, refracted by, and/or reflected from the light-scattering element. The optical probe still further includes a light-measuring device (15) for measuring the intensity of the light received by the aperture stop. The light-scattering element and the aperture stop are arranged in fixed relationship with respect to each other. In operation, as an incident light beam (16) enters the substrate, some of the light strikes and is scattered by, refracted by, and/or reflected from the light-scattering element. Some of such light is then received by the aperture stop and the light-measuring device. Because the intensity of the incident light beam is proportional to the power of the light limited by the aperture stop and detected by the light-measuring device, the probe determines the intensity of the incident light. Further, moving the probe with respect to the incident light allows the probe to be used to measure the intensity distribution within the incident light at various locations.

34 Claims, 22 Drawing Sheets

OTHER PUBLICATIONS

King, C.R., et al., "Out–of–Plane Refractive Microlens Fabricated by Surface Micromachining," *IEEE Photonics Technology Letters*, vol. 8, No. 10, Oct. 1996, pp. 345–347.

Wu, M.C., et al., "Micromachined Free–Space Integrated Micro–Optics," *Sensors and Actuators A: Physical*, vol. 50, No. 1–2, Aug. 1995, pp. 79–85.

Fan, L., et al., "Self–Assembled Microactuated XYZ States for Optical Scanning and Alignment," *Transducers '97, International Conference on Solid–State Sensors and Actuators*, vol. 1, 1997, pp. 424–427.

Michaelis, J., et al., "A Single Molecule as a Probe of Optical Intensity Distribution," *Optics Letters*, vol. 24, No. 9, May 1, 1999, pp. 581–583.

* cited by examiner

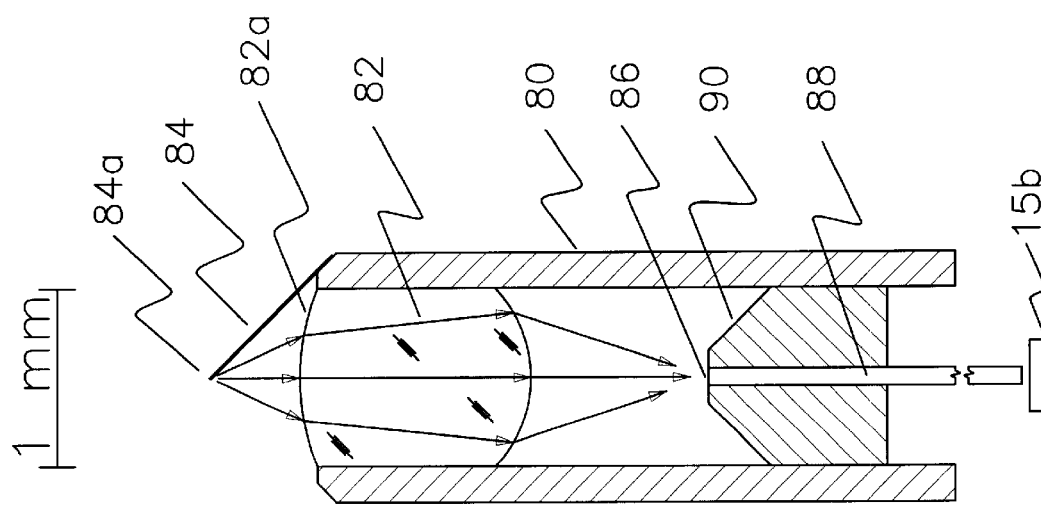
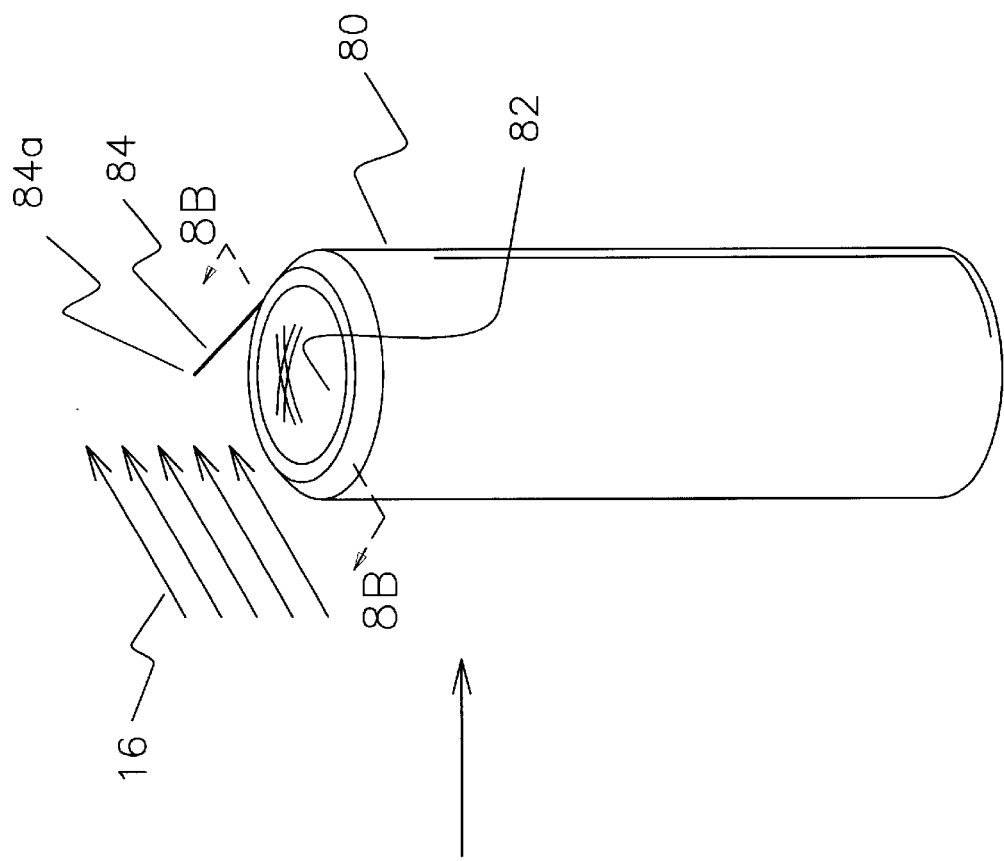
Fig. 8B.
Fig. 8A.

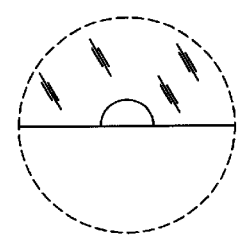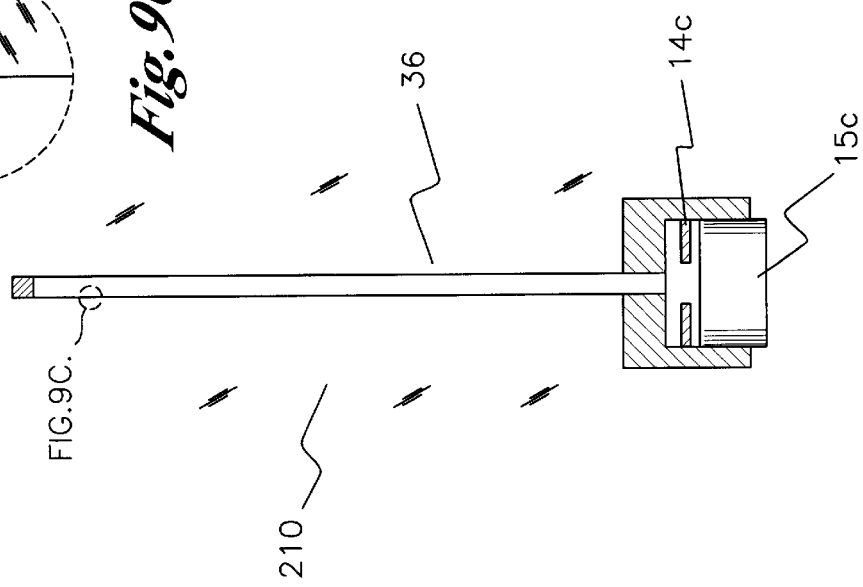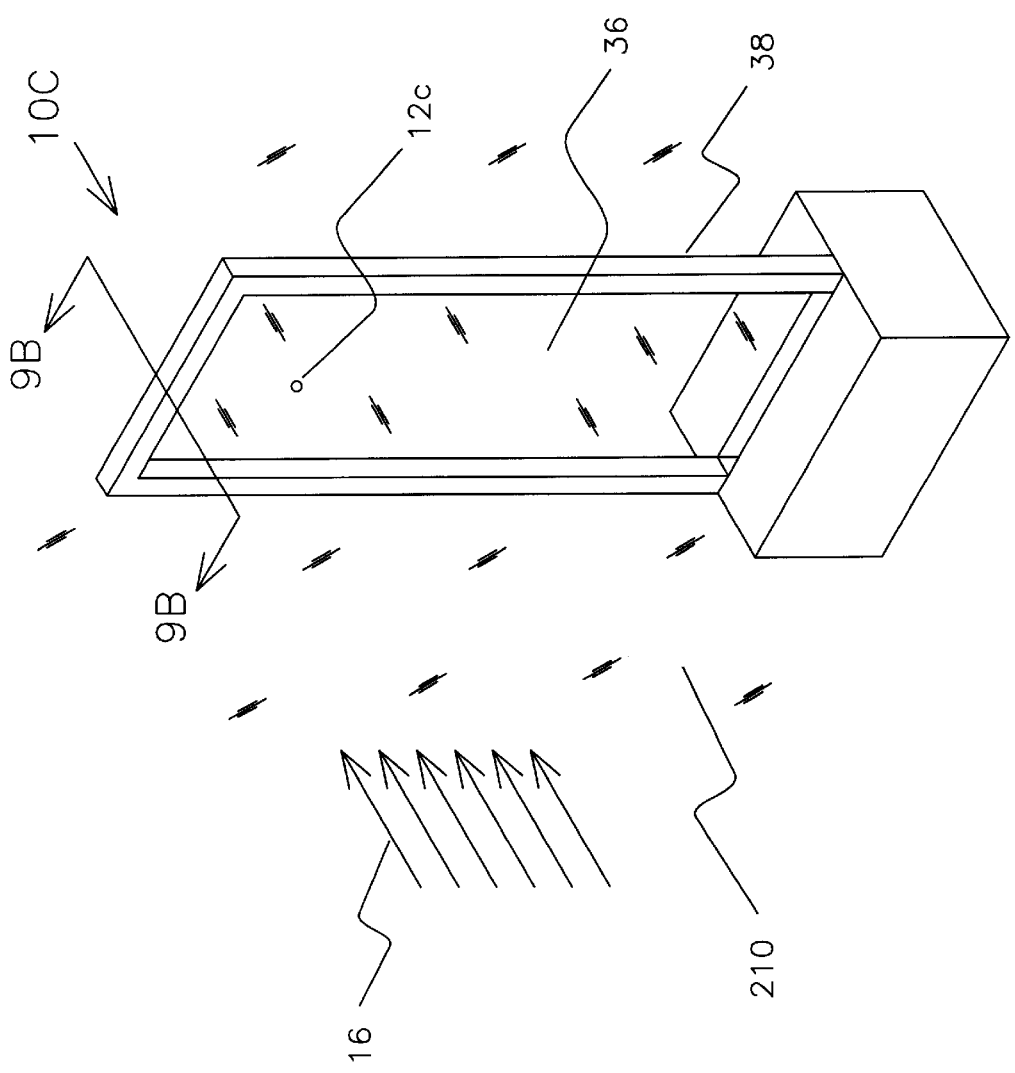

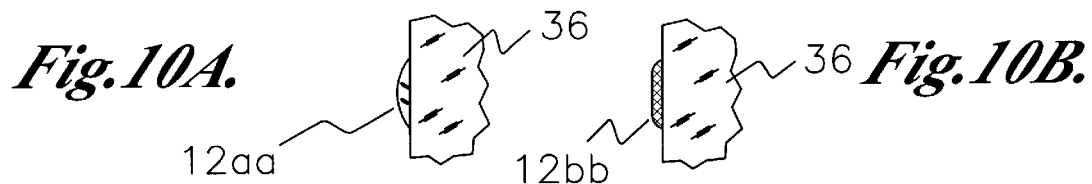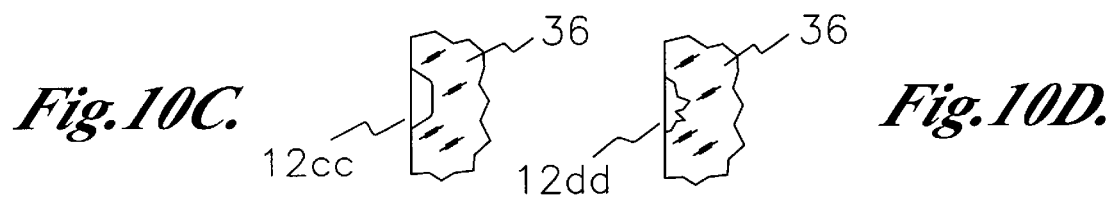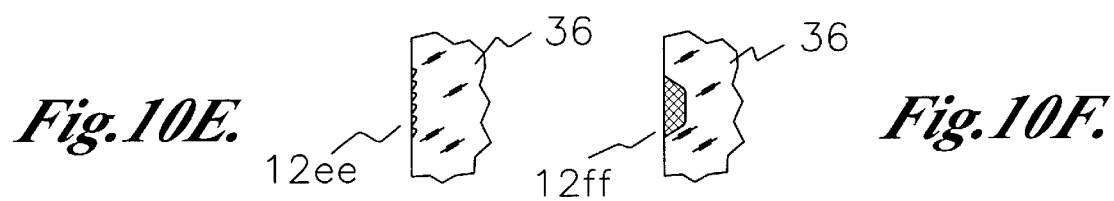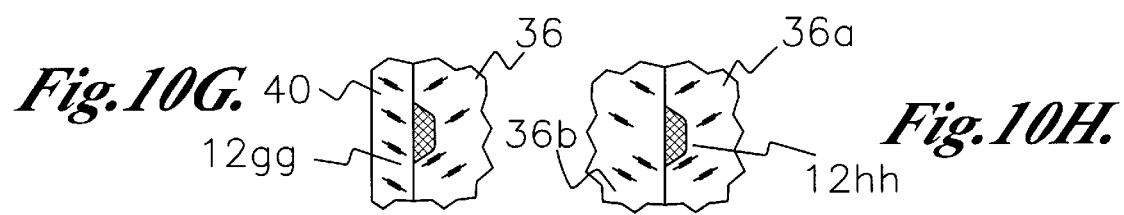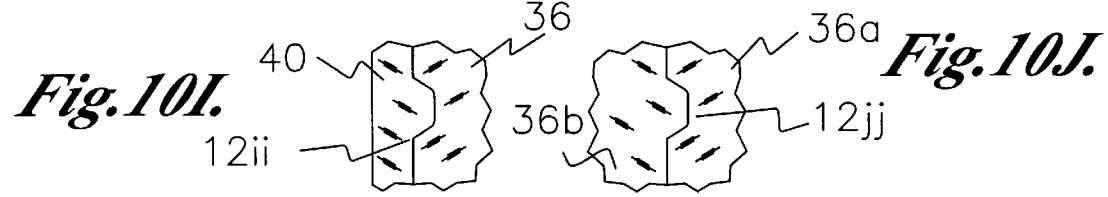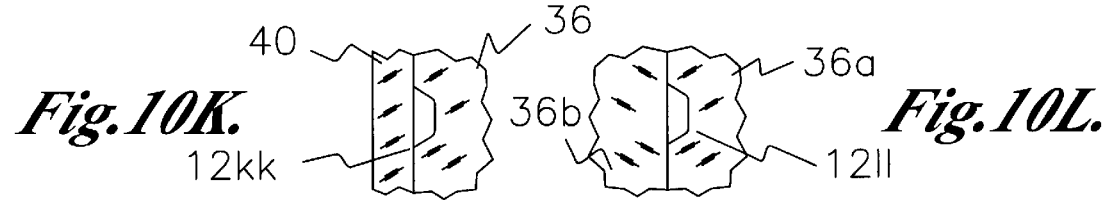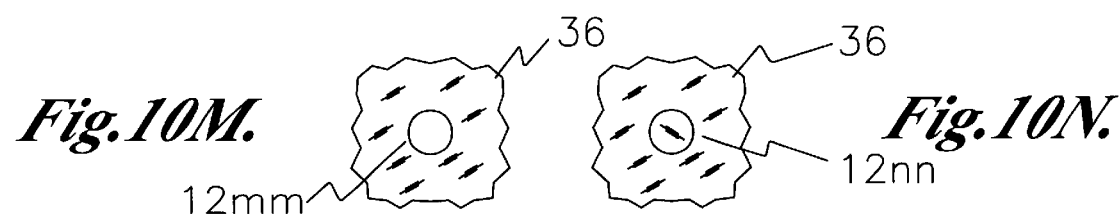

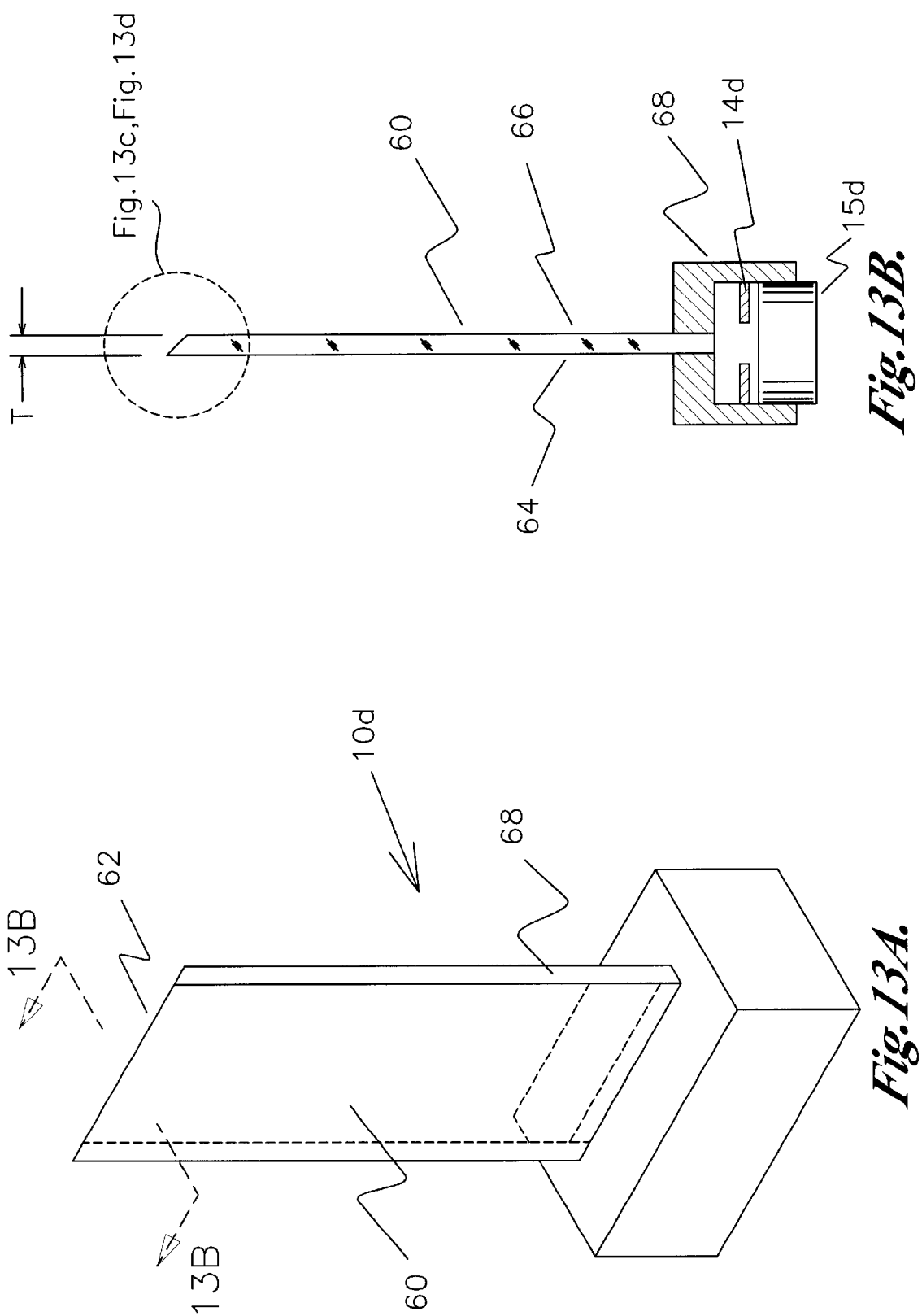

OPTICAL PROBE

FIELD OF THE INVENTION

The present invention relates to probes, and more particularly to optical probes for measuring the intensity and/or intensity distribution of an incident light beam.

BACKGROUND OF THE INVENTION

Various optical probes have been proposed in the past to measure the intensity of a light beam. Such probes include charged-coupled device (CCD) camera probes, silicon detector probes, photodetector probes, pinhole probes, and knife-edge probes. CCD camera, silicon detector, and photodetector probes have the disadvantage of being relatively large. Their large size limits their application to situations where there is ample space for placing or installing probe instrumentation. Another disadvantage of CCD camera, silicon detector, and photodetector probes is that they all absorb radiation over a small sensitive area, which renders them susceptible to damage when placed in intense or strong optical fields. While pinhole probes and knife-edge probes do not require as large a space for measuring light intensity, they have the disadvantage of blocking and scattering a large portion of an incident light beam to distort the measurement of the intensity of the incident light. Thus, these probes are often not as accurate as desired.

Thus, a need exists for an optical probe whose size can be freely adjusted to be placed in a relatively small space as well as a relatively large space. Such an optical probe, preferably, should not be susceptible to damage when exposed to strong optical fields. Further, such an optical probe should provide an accurate measurement of the intensity and/or intensity distribution of the light beam. The present invention is directed to providing such a probe.

SUMMARY OF THE INVENTION

In accordance with the present invention, an optical probe for measuring the intensity and/or intensity distribution of a light beam is provided. An optical probe formed in accordance with one embodiment of the invention includes a substrate formed of nonlight-absorbing material. A light-scattering element is included in the substrate. The light-scattering element has an index of refraction different from that of the substrate. For example, the substrate may be formed of a transparent plastic or glass block and the light-scattering element may be formed of an air bubble trapped within the block. The optical probe further includes an aperture stop for receiving the light scattered by, refracted by, and/or reflected from the light-scattering element. The light-scattering element and the aperture stop are arranged in fixed relationship with respect to each other. The optical probe still further includes a light-measuring device for measuring the intensity of the light received by the aperture stop.

In operation, as an incident light beam enters the substrate, some of the light strikes and is scattered by, refracted by, and/or reflected from the light-scattering element. Some of such light is then received by the aperture stop and then by the light-measuring device. Because the intensity of the incident light beam is proportional to the power of the light received by the aperture stop and transmitted to the light-measuring device, measuring the light collected by the light-measuring device allows the probe to determine the intensity of the incident light. Further, moving the probe with respect to the incident light and measuring the intensity of the light at various locations allows the probe to measure the intensity distribution within the incident light.

Optionally, the optical probe may further include a lens positioned between the light-scattering element and the aperture stop to receive the light scattered by, refracted by, and/or reflected from the light-scattering element. The combination of the lens and the aperture stop isolates the light scattered by, refracted by, and/or reflected from the light-scattering element from the light scattered by, refracted by, and/or reflected from other portions of the optical probe. As a result, only the light from the light-scattering element is received by the light-measuring device, improving the accuracy of the measured incident light.

An optical probe formed in accordance with the present invention may be fabricated in micron scale using various micromachining techniques.

An optical probe formed in accordance with another embodiment of the present invention includes an elongated support having a tip. A light-scattering element is associated with the tip of the elongated support. For example, the elongated support may be formed of a wire and the light-scattering element may be formed of glass attached to the tip of the wire. The optical probe further includes an aperture stop for receiving the light scattered by, refracted by, and/or reflected from the light-scattering element. The light-scattering element and the aperture stop are arranged in fixed relationship with respect to each other. The optical probe still further includes a light-measuring device for measuring the intensity of the light received by the aperture stop.

In operation, the light-scattering element of the optical probe is placed in the propagation path of an incident light beam. As before, some of the incident light beam strikes and is scattered by, refracted by, and/or reflected from the light-scattering element. Some of the light from the light-scattering element is received by the aperture stop and the light-measuring device, allowing the probe to measure the intensity and/or intensity distribution of the incident light.

As with the previous embodiment, optionally, the optical probe may further include a lens so as to isolate the light scattered by, refracted by, and/or reflected from the light-scattering element from the light scattered by, refracted by, and/or reflected from the elongated support, so that only the light from the light-scattering element is received by the light-measuring device.

Also as before, the optical probe of this embodiment may be fabricated in micron scale using various micromachining techniques. A microversion of the optical probe may further include a one-, two-, or three-dimensional microactuator adapted to move the light-scattering element of the optical probe with respect to an incident light beam. This feature allows the intensity distribution within the incident light beam to be measured.

An optical probe formed in accordance with yet another embodiment of the present invention includes a substrate in the form of a sheet (substrate sheet). The optical probe further includes a light-scattering element associated with the substrate sheet, and a light-measuring device for receiving and measuring the light scattered by, refracted by, and/or reflected from the light-scattering element and directed through the substrate sheet. For example, the substrate sheet may be formed of glass, and the light-scattering element may be formed of a void defined on or in the substrate sheet or material having light-scattering property deposited on or in the substrate sheet. This embodiment is suited for measuring the intensity of light propagating between closely spaced optical elements.

In operation, as incident light strikes the surface of the substrate sheet and propagates therethrough, some of the light strikes and is scattered by, refracted by, and/or reflected from the light-scattering element. Some of such light is directed through the substrate sheet and is gathered by the light-measuring device, allowing the probe to measure the intensity of the incident light.

Optionally, the substrate sheet may include polymer dispersed liquid crystal (PDLC) including orthogonally arranged sets of horizontal transparent conductive strips and vertical transparent conductive strips. In this case, the light-scattering element comprises a volume sandwiched between a pair of selected horizontal and vertical transparent conductive strips, between which an electric field is created. Use of PDLC allows the optical probe to selectively position the light-scattering element over the surface area of the substrate sheet.

As before, this embodiment of the optical probe may be fabricated in micron scale using micromachining techniques.

An optical probe formed in accordance with a further alternative embodiment of the present invention includes a substrate sheet that defines a sloped surface, to which an incident light beam is to be directed at an angle. The optical probe further includes a light-measuring device coupled to the substrate sheet for receiving the light scattered by, refracted by, and/or reflected from the sloped surface and directed through the substrate sheet.

In operation, as incident light strikes the substrate sheet and propagates therethrough, some of the light strikes and is scattered by, refracted by, and/or reflected from the sloped surface. This light is directed through the substrate sheet and received by the light-measuring device, allowing the probe to measure the intensity of the incident light.

The space required for an optical probe constructed in accordance with the present invention is on the order of the size of the light-scattering element used. Varying the size of the light-scattering element using various fabrication methods allows optical probes of various sizes to be constructed. For example, using micromachining techniques, an optical probe of a size on the order of microns can be designed. Also, the spatial resolution of the measured intensity distribution map can be freely adjusted by varying the light-scattering element's size. Because the incident light is scattered by, refracted by, and/or reflected from the light-scattering element, as opposed to necessarily being absorbed by it, and because only the light thus scattered by, refracted by, and/or reflected from the light-scattering element is received by a light-measuring device, a probe formed in accordance with the present invention is not susceptible to damage even when used in relatively strong optical fields. Further, an optical probe of the present invention allows the intensity and/or intensity distribution of an incident light beam to be accurately measured. The invention accomplishes this by isolating the light from a light-scattering element from the stray light from objects other than the light-scattering element. As a result, only the light from the light-scattering element is received by the light-measuring device and intensity measured.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein:

FIG. 8A illustrates a modification of the optical probe of FIG. 6;

FIG. 8B is a cross-sectional view of the optical probe of FIG. 8A;

FIG. 9A illustrates yet another embodiment of an optical probe formed in accordance with the present invention;

FIG. 9B is a cross-sectional view of the optical probe of FIG. 9A;

FIG. 9C is an enlarged view of the circled section "FIG. 9C" included in FIG. 9B;

FIGS. 10A through 10N illustrate various configurations of a light-scattering element, suitable for use with the optical probe of FIGS. 9A and 9B and other embodiments;

FIG. 13A illustrates a further alternative embodiment of an optical probe formed in accordance with the present invention;

FIG. 13B is a cross-sectional view of the optical probe of FIG. 13A;

DETAILED DESCRIPTION OF THE PREFERRED EMBODIMENTS

The present invention provides an optical probe for measuring the intensity and/or intensity distribution in a light beam. As described more fully below, FIGS. 1 through 13D generally describe optical probes constructed in millimeter scale, while FIGS. 14 through 20 generally describe micro-optical probes constructed in micron scale. The present invention provides optical probes of various sizes simply by scaling an optical probe up or down.

Figure 1:
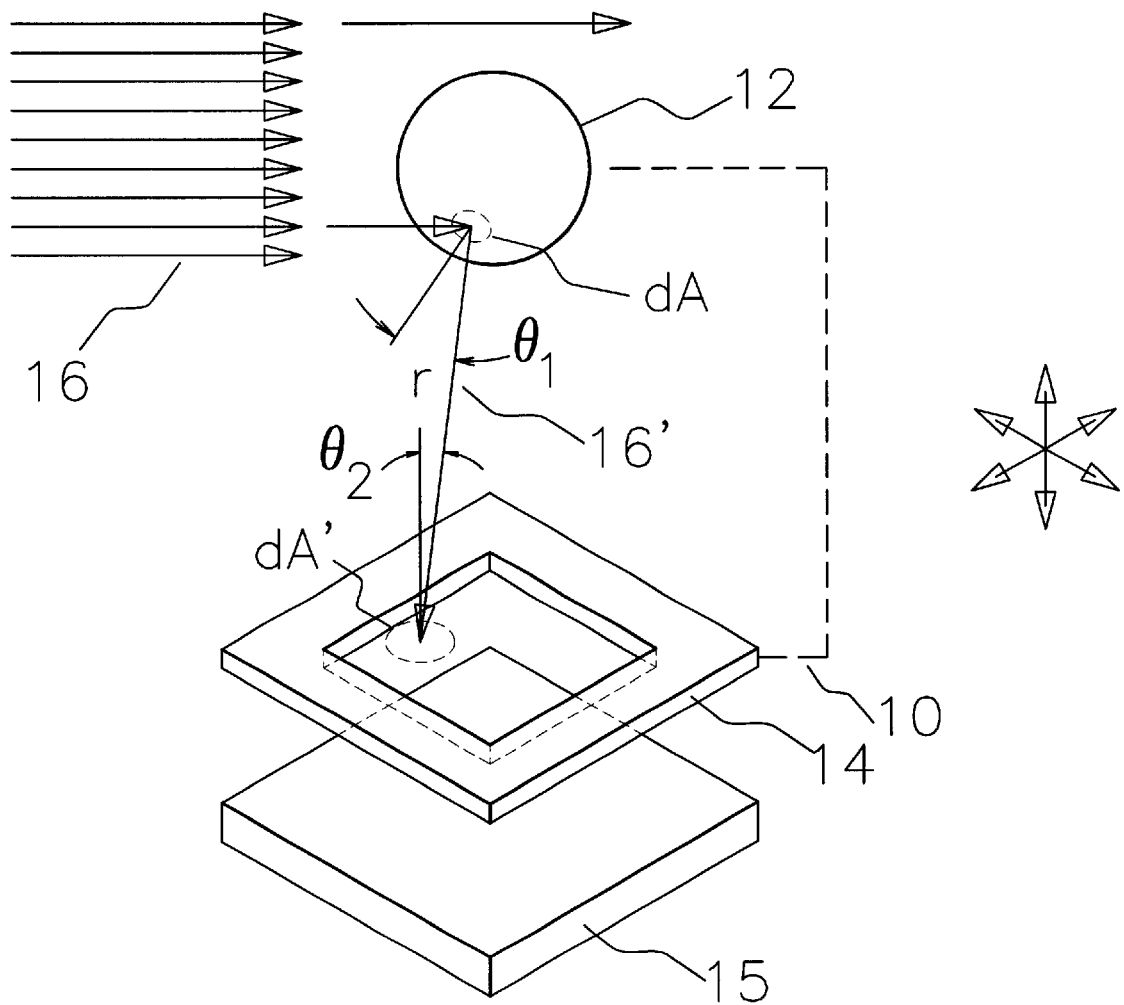
FIG. 1 schematically illustrates the basic concept of an optical probe formed in accordance with the present invention.
Figure 2:
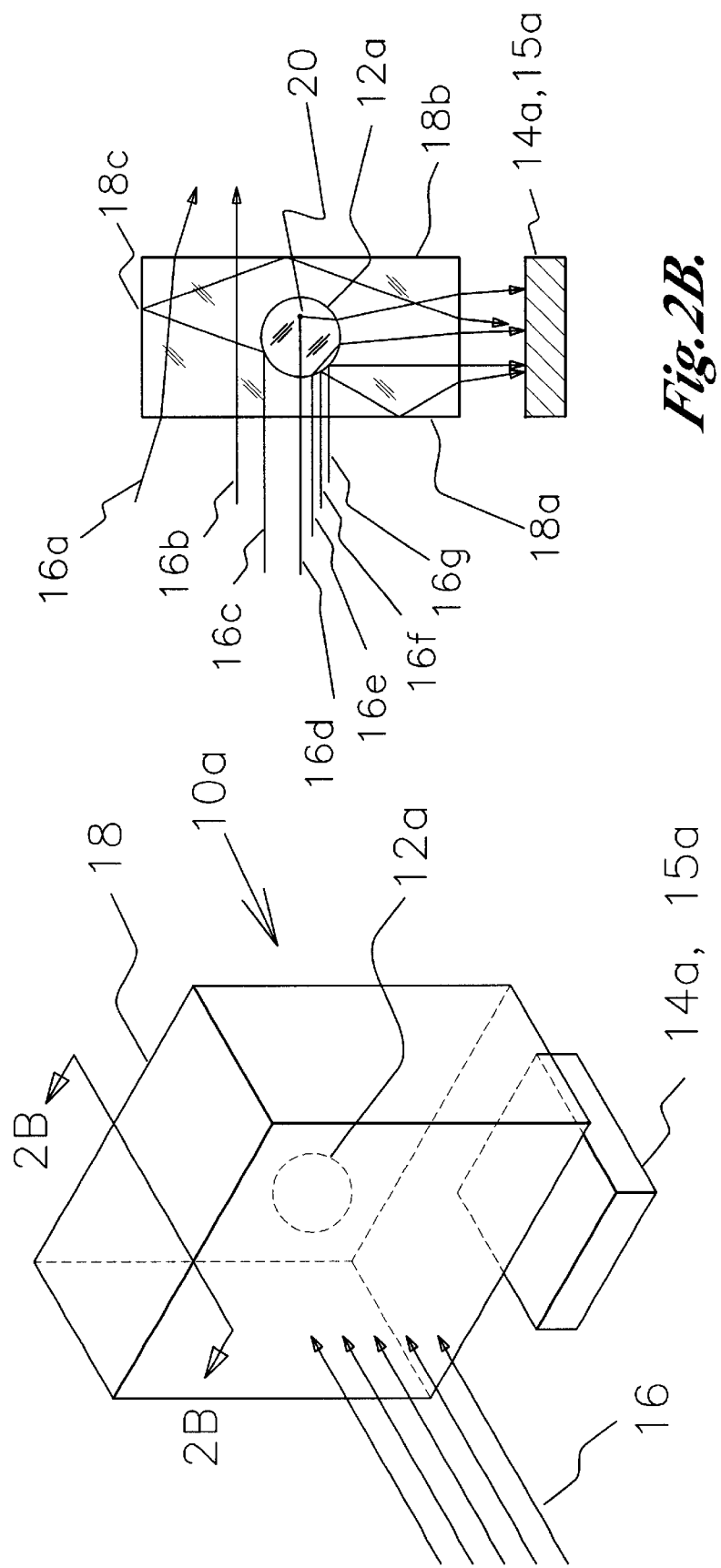
FIG. 2A illustrates one embodiment of an optical probe formed in accordance with the present invention.
FIG. 2B is a cross-sectional view of the optical probe of FIG. 2A.
Figure 3:
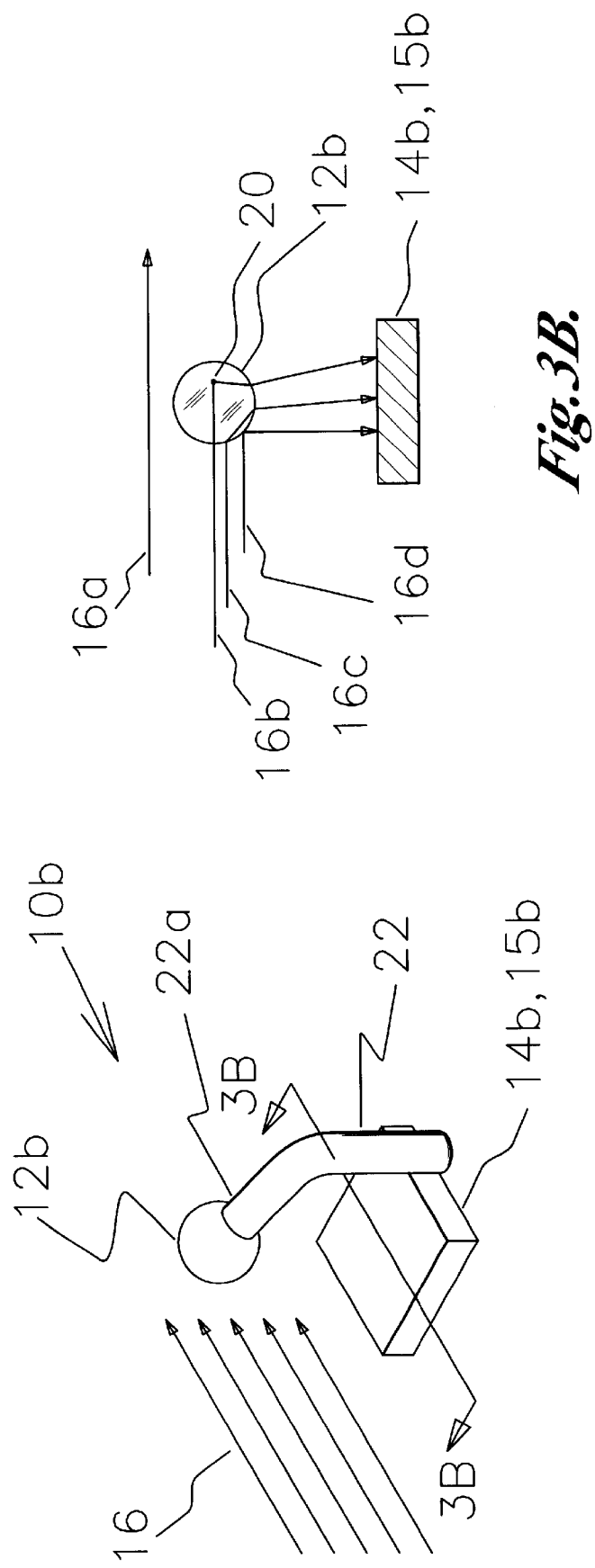
FIG. 3A illustrates another embodiment of an optical probe formed in accordance with the present invention.
FIG. 3B is a cross-sectional view of the optical probe of FIG. 3A.

FIG. 1 illustrates the basic concept of an optical probe formed in accordance with the present invention. The probe 10 comprises a light-scattering element 12 and an aperture stop 14 for receiving some of the light scattered by, refracted by, or reflected from the light-scattering element 12. The light-scattering element 12 and the aperture stop 14 are arranged in controlled relationship, for example a fixed relationship as illustrated in FIG. 1, with respect to each other within the probe 10. The probe 10 further includes a light-measuring device 15.

In operation, as an incident light beam 16 enters the probe 10, some of the light strikes the light-scattering element 12 and is scattered by, refracted by, or reflected from the light-scattering element. Some of such light 16' from the light-scattering element 12 is received by the aperture stop 14 and by the light-measuring device 15. The aperture stop 14 serves to limit the amount of light that reaches the light-measuring device 15. The power of the light limited by the aperture stop 14 and collected by the light-measuring device 15 is proportional to the intensity (I) of light incident on the light-scattering element 12 times the area of the light-scattering element 12. Still referring to FIG. 1, for a Lambertian (diffuse) scatterer this relationship can be expressed by the following equation:

$$I \int\int dA \, \frac{\cos(\theta 1)\cos(\theta 2)}{r^2} dA' = \quad (1)$$

Power of light received by the aperture stop 14 where A represents the area of the light-scattering element 12 and dA represents the differential of A; A' represents the area of the aperture stop 14 and dA' represents the differential of A'; θ1 is the angle between the perpendicular of dA and the light transmitted from dA; θ2 is the angle between the perpendicular of dA' and the light incident on dA'; and r represents the distance between dA and dA'. Thus, by measuring the power of light received by the aperture stop 14 (accomplished by the light-measuring device 15), the probe of the present invention can measure the intensity (I) of the light that is incident on the light-scattering element 12.

Moving the probe 10, including both the light-scattering element 12 and the aperture stop 14, with respect to the incident light beam 16, and measuring the intensity of the light incident on the light-scattering element 12 at various locations, allow the intensity distribution within the incident light beam 16 to be measured.

FIGS. 2A and 2B illustrate one embodiment of an optical probe 10a formed in accordance with the present invention. The optical probe 10a includes a light-scattering element 12a included in, or positioned within, a solid substrate 18. The substrate 18 may be formed of any nonlight-absorbing material having a different index of refraction from that of the light-scattering element 12a. For example, the light-scattering element 12a may comprise an air bubble trapped within a transparent plastic or glass block 18 (substrate). An aperture stop 14a is placed adjacent the substrate 18 at a fixed relationship with respect to the substrate 18.

A light-measuring device 15a may be any device adapted to provide a light flux measurement. A photodiode, photomultiplier, spectrophotometer, and silicon detector are some examples of the light-measuring devices suitable for use in the present invention. Referring back to FIG. 1, the light-measuring device 15 may exist independently of the aperture stop 14 and receive the light limited by the aperture stop 14. Alternatively, as illustrated in FIG. 2A, the light-measuring device 15a and the aperture stop 14a may be integrally formed, for example, in the case of a silicon detector. As known in the art to those familiar with a silicon detector, an active region for light measuring in a silicon detector effectively comprises an aperture stop.

Referring specifically to FIG. 2B, the substrate 18 includes a forward surface 18a, a rearward surface 18b, and a top surface 18c. In operation, some portions of the incident light beam pass through the substrate 18 unaffected by the light-scattering element 12a. For example, a light beam 16a enters and exits the substrate 18 through the forward surface 18a and the rearward surface 18b, respectively, each time being refracted. A light beam 16b propagates straight through the substrate 18. Other portions of the incident light beam 16, on the other hand, are scattered by, refracted by, and/or reflected from the light-scattering element 12a and directed toward the aperture stop 14a. For example, a light beam 16c is reflected by the element 12a, the top surface 18c, and the rearward surface 18b of the substrate 18, and is directed toward the aperture stop 14a. A light beam 16d entering the substrate 18 and the light-scattering element 12a is scattered by a light-scattering center 20 located within the light-scattering element 12a, and is directed toward the aperture stop 14a. A light beam 16e that enters and exits the light-scattering element 12a, each time refracted, is directed toward the aperture stop 14a. A light beam 16f that is reflected from the light-scattering element 12a, again reflected from the forward surface 18a of the substrate 18, is directed toward the aperture stop 14a. Finally, a beam 16g is reflected from the element 12a toward the aperture stop 14a.

It is noted that the substrate 18 in the above example partially functions as a waveguide. Specifically, the light beams 16c and 16f are both guided by the periphery of the substrate 18 toward the aperture stop 14a, while the light beams 16d, 16e, and 16g are directed toward the aperture stop 14a without guiding by the substrate 18.

The light beams 16a through 16g described above are some examples of light propagation paths. Many other propagation paths for both the light passing through the substrate 18 unaffected by the light-scattering element 12a and the light scattered by, refracted by, and/or reflected from the light-scattering element 12a will be obvious to those skilled in the art. It should also be understood that, as used in the present description, the "light-scattering" element 12a not only scatters but also refracts and reflects light as described above.

To allow for the maximum amount of the incident light 16 to enter the substrate 18 and strike the light-scattering element 12*a* and to reduce or eliminate Fresnel reflection of rays 16*a* and 16*b*, the exterior surface of the forward surface 18*a*, on which the incident light impinges, preferably includes an antireflection coating.

As discussed in reference to Equation (1) above, the sum of all the light beams collected (or limited) by the aperture stop 14*a* equals the intensity of the light incident on the light-scattering element 12*a* times a certain fixed value, or the constant of proportionality, $$\left(\int\int dA \frac{\cos(\theta 1)\cos(\theta 2)}{r^2} dA'\right),$$

which is a function of the geometry of the light-scattering element 12*a*. One may ascertain this constant of proportionality by applying a light beam of known intensity (I) to the light-scattering element 12*a* and measuring the light received by the aperture stop 14*a* and by the light-measuring device 15*a*. In this way, an optical probe formed in accordance with the present invention can be easily calibrated even when the geometry of the light-scattering element 12*a* is too complex and direct calculation of the fixed value is difficult. Further, even without accurate calibration, an optical probe formed in accordance with the present invention as illustrated in FIGS. 2A and 2B may still be used to measure the light distribution within a light beam by moving the probe with respect to the incident light and comparing the values measured by the light-measuring device 15*a*.

For a light-scattering element and an aperture stop to be in "controlled relationship" within the meaning of this invention, a light-scattering element may be moved with respect to an aperture stop. As long as the position of the light-scattering element with respect to the aperture stop can be controlled and known, the relationship between the intensity of the light incident on the light-scattering element and the power of light received by (limited by) the aperture stop can be expressed as in Equation (1). Thus, the constant of proportionality $$\left(\int\int dA \frac{\cos(\theta 1)\cos(\theta 2)}{r^2} dA'\right)$$

as the light-scattering element is controllably moved with respect to the aperture stop may be calculated a priori or may be ascertained by calibration (i.e., by applying a light beam of known intensity (I) to the light-scattering element and measuring the light received by the aperture stop) as described above. In other words, the power of light received by the aperture stop is a repeatable function of the particular position of the light-scattering element as the light-scattering element is moved with respect to the aperture stop.

FIGS. 3A and 3B illustrate an alternative embodiment of an optical probe 10*b* formed in accordance with the present invention. The optical probe 10*b* of this embodiment includes an elongated support 22 having a tip 22*a*, and a light-scattering element 12*b* associated with the tip 22*a*. For example, the light-scattering element 12*b* may comprise a small piece of glass (for example, milk glass available from Schott Glass of Mainz, Germany) affixed to the tip 22*a* of a wire 22. Another end of the wire 22, attached to an aperture stop 14*b* and a light-measuring device 15*b*, maintains the light-scattering element 12*b* and the aperture stop 14*a* in controlled, fixed relationship. FIG. 3B shows a light beam 16*a* propagating through the optical probe 10*b* unaffected by the light-scattering element 12*b*. Another light beam 16*b* is shown as entering the light-scattering element 12*b*, being scattered by a light-scattering surface 20 within the light-scattering element 12*b*, and being directed toward the aperture stop 14*b*. A further light beam 16*c* that enters and exits the light-scattering element 12*b*, each time refracted, is directed toward the aperture stop 14*b*. A light beam 16*d* is shown as reflected from the light-scattering element 12*b* toward the aperture stop 14*b*. Measuring the intensity of the light received by the aperture stop 14*b* and the light-measuring device 15*b* allows the intensity and/or intensity distribution of the incident light 16 to be ascertained.

Figure 4:
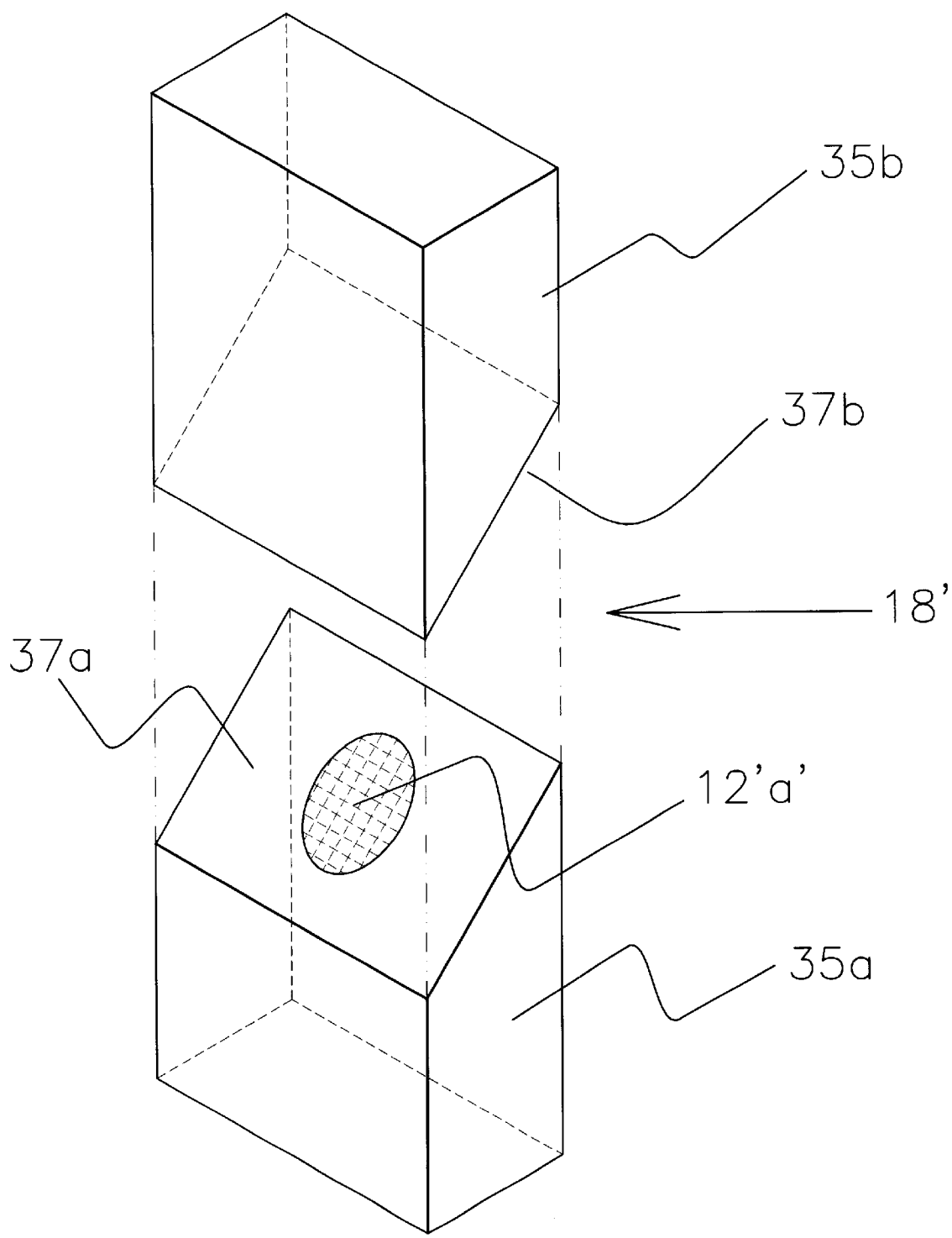
FIG. 4 illustrates an alternative configuration of a substrate used in the optical probe of FIGS. 2A and 2B.

FIG. 4 illustrates an alternative configuration of a substrate 18', which can be used in place of the substrate 18 of the optical probe 10*a* of FIGS. 2A and 2B. In FIG. 4, the substrate 18' is formed of a pair of polished glass blocks 35*a*, 35*b*. Each block includes slanted edge surfaces 37*a*, 37*b*, which complement one another so that a solid substrate 18' is formed when the two polished glass blocks 35*a*, 35*b* are combined together. A light-scattering element 12*a'*, such as aluminum or dielectric stack, is deposited using soft lithography on the slanted edge surface 37*a* of one of the polished glass blocks 35*a*. Other light-scattering materials may also be deposited using other suitable methods. After the light-scattering element 12*a'* is deposited, the two blocks 35*a*, 35*b* are bonded together using adhesive, and the entire surface of the resulting substrate 18' is polished to remove any excess adhesive squeezed out of the joint between the two blocks 35*a*, 35*b*. Because this embodiment allows for freely and controllably adjusting the size and shape of the light-scattering element 12*a'*, this embodiment of a substrate is preferred when it is desired to provide a light-scattering element 12*a'* having a particular size and shape or when it is desired to scatter only particular wavelengths. Thus, the shape of the light-scattering element 12*a'* is not limited to an oval as illustrated, but may have various other shapes, sizes, or patterns as well as different materials or reflecting structures.

Figure 5:
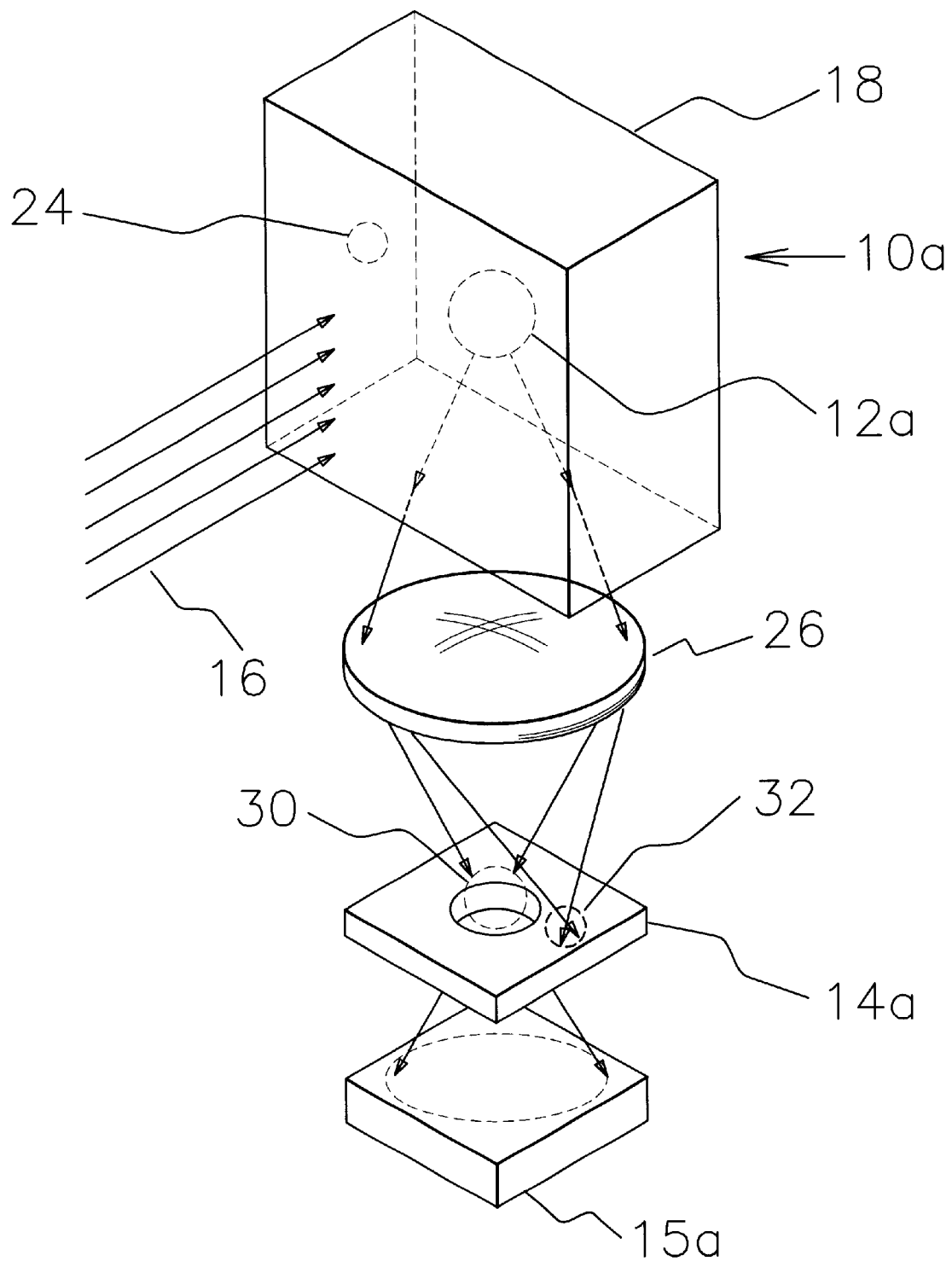
FIG. 5 illustrates a modification of the optical probe of FIGS. 2A and 2B that includes a lens.

Next referring to FIG. 5, in some situations it may be difficult to place only one light-scattering element 12*a* within a substrate 18 of an optical probe 10*a* of the type illustrated in FIGS. 2A and 2B due to imperfection in fabrication methods. For example, it may be difficult to trap only one air bubble within a transparent plastic box when using conventional molding methods. Thus, the substrate 18 may contain an undesired light-scattering element 24 (additional air bubble, for example) that also scatters, refracts, and/or reflects incident light 16. In such case, the light scattered by, refracted by, and/or reflected from the light-scattering element 12*a* should be isolated from other light. To this end, as shown in FIG. 5, the optical probe 10*a* may further include a lens 26 arranged between the light-scattering element 12*a* and the aperture stop 14*a*. The lens 26 serves to form an image 30 of the desired light-scattering element 12*a* and another image 32 of the undesired light-scattering element 24. The aperture stop 14*a* serves to limit the field of view of the light-measuring device 15*a* so that only the image 30 of the desired light-scattering element 12*a*, i.e., the light scattered by, refracted by, and/or reflected from the desired light-scattering element 12*a*, reaches the light-measuring device 15*a*. Thus, in this embodiment, the aperture stop 14*a* serves as a field stop.

Figure 6:
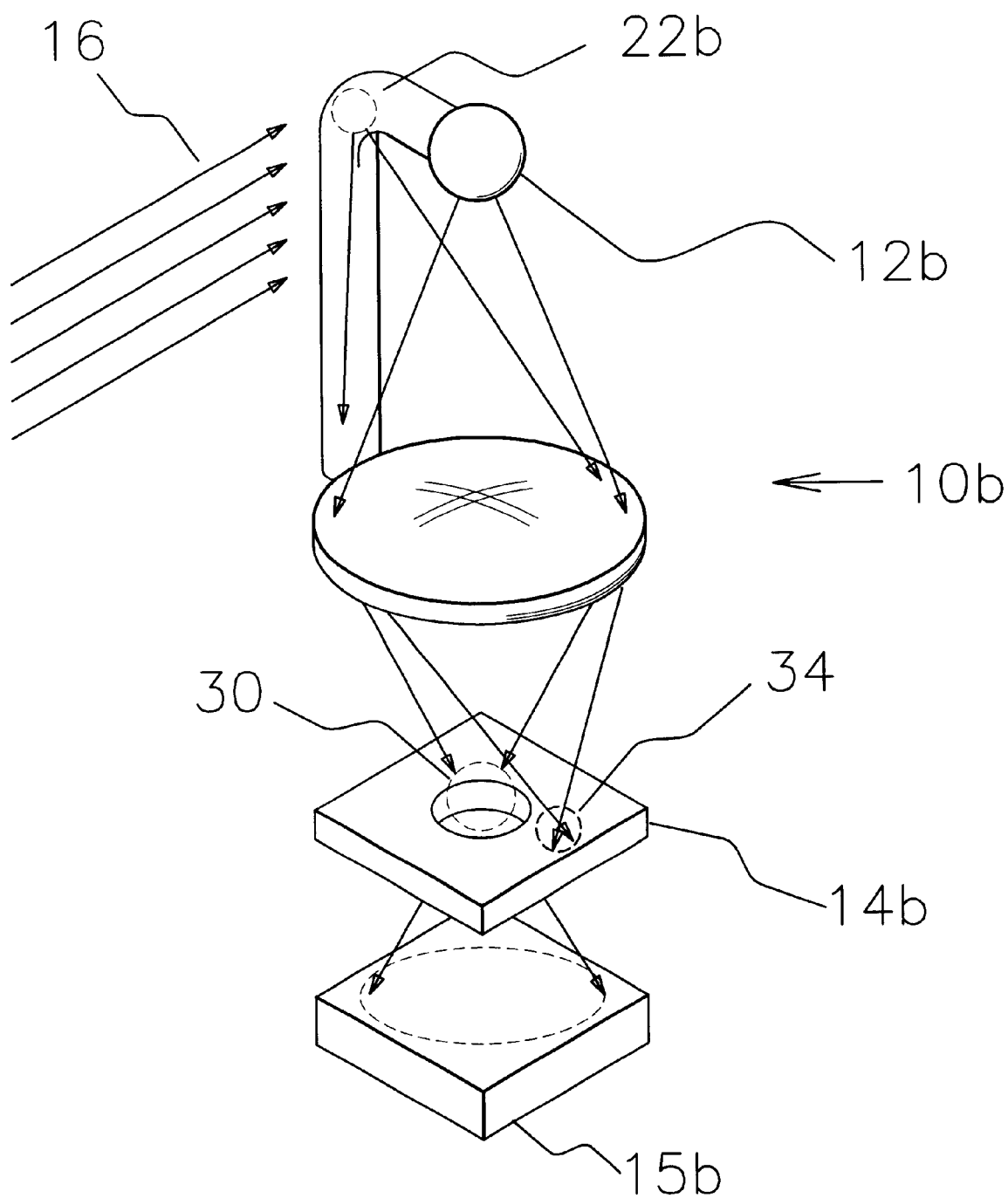
FIG. 6 illustrates a modification of the optical probe of FIGS. 3A and 3B that includes a lens.

Referring to FIG. 6, the same principle discussed above with respect to FIG. 5 can be used with the optical probe 10*b* of FIGS. 3A and 3B, to isolate the light scattered by, refracted by, and/or reflected from the light-scattering element 12*b* from the light scattered by, refracted by, and/or reflected from other light-scattering elements 22*b* formed in the elongated support 22. Specifically, the optical probe 10*b* may include a lens 26 to transmit only an image 30 of the light-scattering element 12b to the aperture stop 14b, while blocking an image 34 of the light-scattering elements 22b formed in the elongated support 22.

Figure 7B:
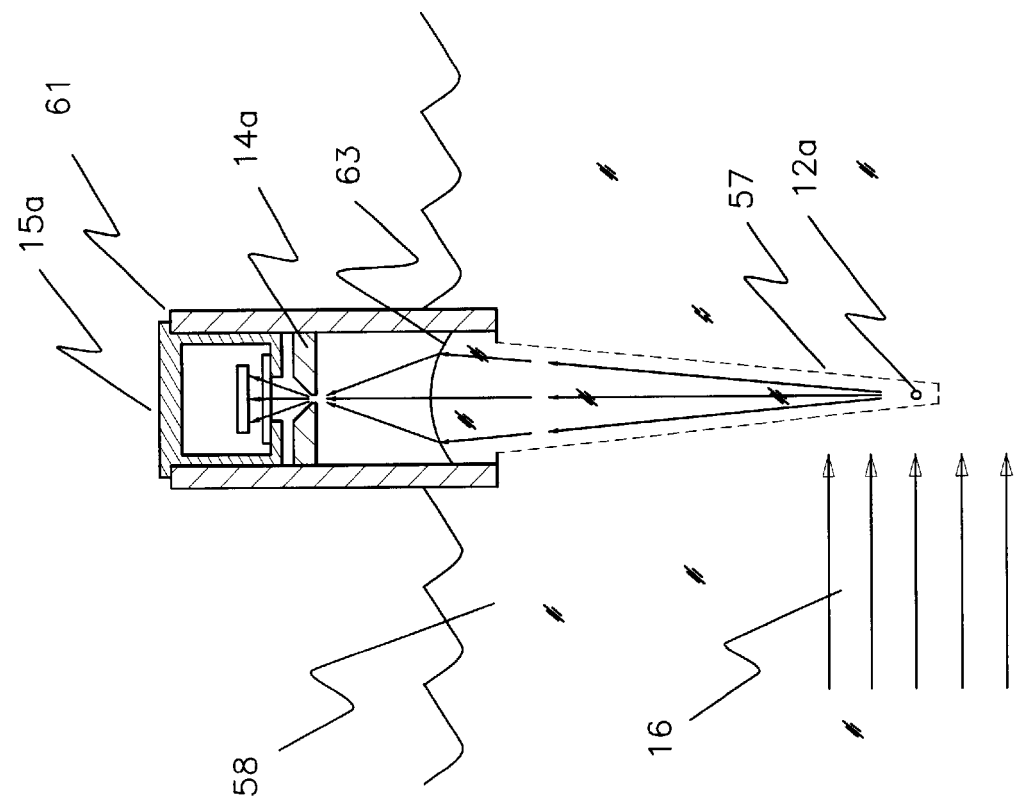
FIG. 7B is a cross-sectional view of the optical probe of FIG. 7A.
Figure 7A:
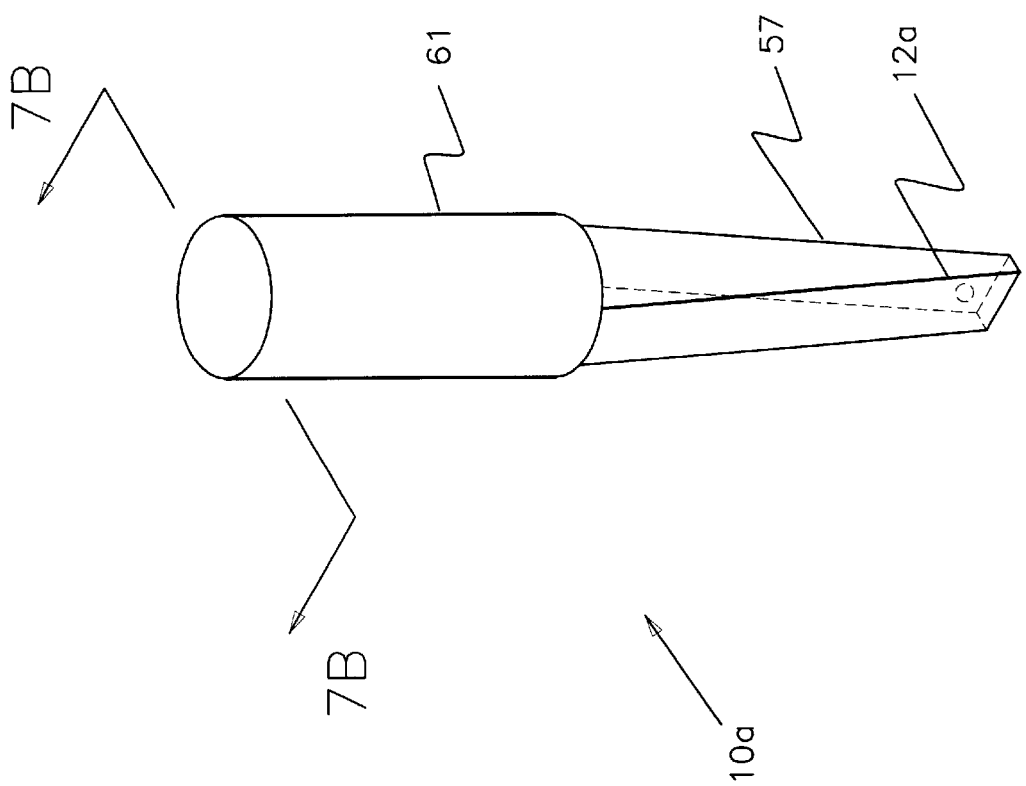
FIG. 7A illustrates a modification of the optical probe of FIG. 5.

FIGS. 7A and 7B illustrate a variation of the optical probe 10a of FIG. 5, which is suitable for use in liquid or air. In this embodiment of the invention, the optical probe 10a includes a substrate in the form of a tapered slab 57 having the light-scattering element 12a within the slab. When the incident medium 58 is liquid as illustrated in FIG. 7B, the tapered slab 57 is advantageously made of any material whose index of refraction is close to that of the incident medium 58, into which the tapered slab 57 is to be submerged. As before, the light-scattering element 12a is made of material whose index of refraction is different from that of the tapered slab 57. For example, as with FIGS. 2A, 2B, and 5, the tapered slab 57 may be formed of transparent plastic and the light-scattering element 12a may be an air bubble trapped within the tapered slab 57. The tapered slab 57 is coupled to a cylindrical housing 61, which houses other elements of the optical probe 10a.

Referring specifically to FIG. 7B, one end of the tapered slab 57 is attached to the housing 61. This end of the tapered slab 57 is configured to form a lens 63. The housing 61 includes within it an aperture stop 14a and a light-measuring device 15a.

In operation, as the tapered slab 57 including the light-scattering element 12a is submerged in the incident medium 58 and an incident light beam 16 propagates through the tapered slab 57, some of the light strikes the light-scattering element 12a and is scattered by, refracted by, and/or reflected from the light-scattering element 12a. Similarly to the optical probe 10a of FIG. 5, the lens 63 and the aperture stop 65 in this embodiment of the invention isolate the light scattered by, refracted by, and/or reflected from the light-scattering element 12 from the rest of the light (for example, light from any foreign objects within the incident medium 58), and direct the isolated light to the light-measuring device 15a for intensity measurement. As before, moving the optical probe 10a and thus the light-scattering element 12a with respect to the incident light beam 16 allows the intensity distribution within the light beam 16 to be measured.

Figures 7C, 7D:
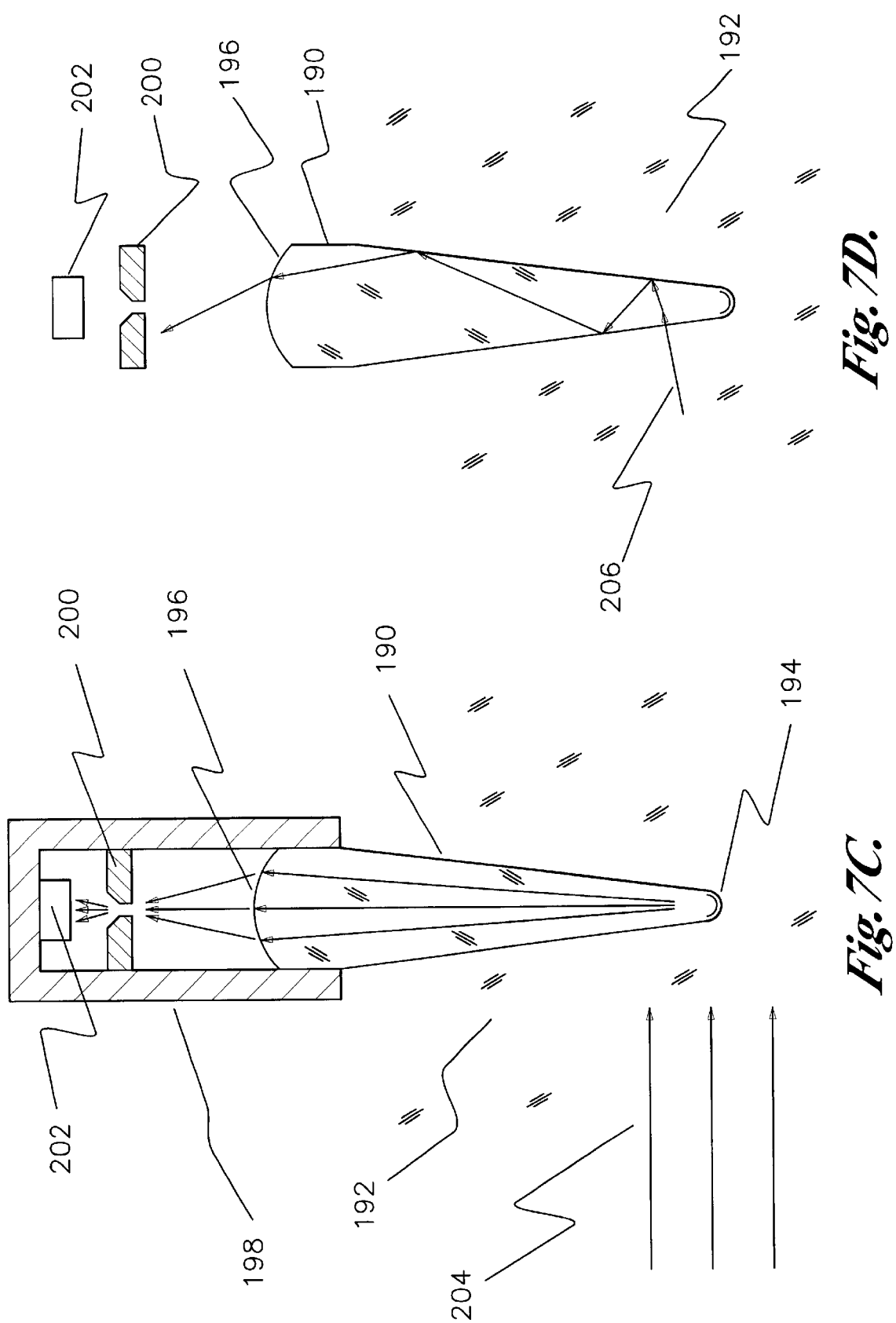
FIG. 7C illustrates a further modification of the optical probe of FIG. 5.
FIG. 7D is a schematic view of the propagation path of a light beam transmitted through the optical probe of FIG. 7C.

FIG. 7C illustrates another variation of the optical probe 10a of FIG. 5, which is suitable for use in liquid or air. The probe 10a illustrated in FIG. 7C includes a substrate in the form of a tapered block 190 having the light-scattering element 194 located at its tip. When the incident medium 192 is liquid, the tapered block 190 is advantageously made from a material whose index of refraction closely matches the liquid, into which the micro-optical probe 10a is to be submerged. The tapered block 190 also includes a convex lens 196 at the end opposite the light-scattering element 194. In the illustrated embodiment of the invention, the tapered block 190 is formed of transparent plastic and the light-scattering element 194 is formed of diffuse plastic coating at the tapering end of the block 190. The tapered block 190 is mounted on one end of a cylindrical housing 198. The cylindrical housing 198 also houses an aperture stop 200 and a light-measuring device 202. The aperture stop 200 is positioned at the image of the light-scattering element 194. The light-measuring device 202 is located on the side of the aperture stop 200 remote from the convex lens 196.

In operation, when the tip of the tapered block 190 that includes the light-scattering element 194 is inserted into the incident medium 192 and an incident light beam 204 propagates through the tapered block 190, some of the light will strike the light-scattering element 194 and be scattered by, refracted by, and/or reflected from the light-scattering element 194. As with other embodiments of this invention, the convex lens 196 and the aperture stop 200 isolate the light scattered by, refracted by, and/or reflected from the light-scattering element 194 from the rest of the light, and direct the isolated light to the light-measuring device 202 for intensity measurement.

As shown in FIG. 7D, light rays 206 that enter the tapered block 190 but do not strike the light-scattering element 194 bounce along the outer surface of the tapered block 190 in a spiral pattern and exit the tapered block 190 via the convex lens 194. The aperture stop 200 prevents such light from reaching the light-measuring device 202. Moving the optical probe 10a and thus the light-scattering element 194 with respect to the incident light beam 204 allows the intensity distribution within the light beam 204 to be measured.

FIGS. 8A and 8B illustrate a variation of the optical probe 10b shown in FIG. 6. More specifically, they illustrate an optical probe 10b of the type shown in FIG. 6 packaged in a hollow cylinder 80. The hollow cylinder 80 includes two end portions 80a, 80b. One end portion 80a of the hollow cylinder 80 is open and includes a lens 82. A thin wire 84, which forms an elongated support having a diameter of, for example, 10 microns is arranged, to extend from the periphery of the end portion 80a of the cylinder 80 so that the tip 84a of the thin wire 84 lies above the lens 82. In this embodiment of the invention, the tip 84a of the wire serves as the light-scattering element of the optical probe 10b. As shown in FIG. 8B, the other end portion 84b of the cylinder 80 houses an aperture stop 86. In the illustrated embodiment, the aperture stop 86 is formed of one end of an optical fiber 88. The other end of the optical fiber 88 terminates at a light-measuring device 15b. Preferably, the optical fiber 88 is supported by a ferrule 90 including a radial slope to reduce stray light, as illustrated. In place of the optical fiber, other types of optical waveguide may also be used to define an aperture stop at one end, within the scope of the present invention.

In operation, as the incident light beam 16 impinges on the thin wire 84, some of the light strikes the tip 84a and is scattered by, refracted by, and/or reflected from the tip 84a and enters the outer surface 82a of the lens 82. The lens 82 directs the light toward the aperture stop 86, from which the light is transmitted through the optical fiber 88 toward the light-measuring device 15b. Measuring the light collected by the light-measuring device 15b allows the intensity and/or intensity distribution in the incident light beam 16 to be ascertained. As with the optical probe 10b of FIG. 6, the lens 82 and the aperture stop 86 of the embodiment of the invention shown in FIGS. 8A and 8B isolate the light scattered by, refracted from, and/or reflected from the tip 84a (i.e., the light-scattering element) of the wire 84 from the light scattered by, refracted by, and/or reflected from other portions of the wire 84. This isolation allows the intensity of the incident light to be accurately measured. The radial slope of the ferrule 90 further serves to prevent any stray light scattered by, refracted by, and/or reflected from the other portions of the wire 84 from entering the optical fiber 88. In this regard, if the upper surface of the ferrule 90 were flat, the light impinging on the flat surface might be reflected in a way that results in the impinging light eventually entering the optical fiber 88.

FIGS. 9A and 9B illustrate yet another embodiment of an optical probe 10c formed in accordance with the present invention suitable for use in liquid or in air. The optical probe 10c shown in FIGS. 9A and 9B includes a substrate 36 in the form of a sheet made of, for example, glass. A light-scattering element 12c is placed on or in the substrate sheet 36, as more fully described below. At one end of the substrate sheet 36 an aperture stop 14c and a light-measuring device 15c are provided. In this embodiment, because the thickness of the substrate 36 is decreased to form a sheet, the substrate sheet 36 functions as a waveguide to guide the light from the light-scattering element 12c toward the limiting aperture 14c and then to the light-measuring device 15c. To function as a waveguide, the sheet 36 must have an index of refraction higher than the incident medium 210. The substrate sheet 36 is supported by a suitable frame 38 that also prevents unwanted light from entering the side surfaces of the substrate sheet 36 and thus reaching the aperture stop 14c. As before, in operation, when incident light 16 enters the substrate sheet 36, some of the light 16 is scattered by, refracted by, and/or reflected from the light-scattering element 12c. Some of this light is directed through the substrate sheet serving as a waveguide to the aperture stop 14c and to the light-measuring device 15c. Measuring the light detected by the light-measuring device 15c allows the intensity and/or intensity distribution in the incident light beam 16 to be ascertained. This embodiment is suited for measuring the light intensity between closely spaced optical elements.

FIG. 9C illustrates the light-scattering element 12c as created by a void formed on the surface of the substrate sheet 36. This illustration is to be taken as exemplary, not limiting. The light-scattering element 12c can be formed in numerous other ways on or in the substrate sheet 36, as illustrated in FIGS. 10A through 10N and described below. These ways can be employed in other embodiments of the invention, as appropriate.

FIG. 10A illustrates a light-scattering element 12aa formed on the surface of the substrate sheet 36, for example, by a drop of resin. FIG. 10B illustrates a light-scattering element 12bb also applied on the surface of the substrate sheet 36, such as silk-screened or stamped ink having light-scattering properties. FIG. 10C illustrates the light-scattering element formed by a void 12cc etched on the surface of the substrate sheet 36. FIG. 10D illustrates the light-scattering element formed by a void 12dd that is scratched or drilled on the surface of the substrate sheet 36. FIG. 10E illustrates a light-scattering element 12ee formed by etching on the surface of the substrate sheet 36 having holographic properties (etch scale is on the order of microns). FIG. 10F illustrates a light-scattering element formed by a void 12ff that is etched on the surface of the substrate sheet 36 and filled with light-scattering material, i.e., any material that has a different index of refraction from that of the substrate sheet 36.

In some embodiments of the invention, it may be preferable not to have the light-scattering element exposed. Rather, it may be desirable to protect the light-scattering element from, for example, damages caused by a user cleaning or contacting the surface of the substrate sheet 36. FIGS. 10G through 10N are exemplary illustrations of protected light-scattering elements. FIG. 10G illustrates a light-scattering element 12gg created by a void formed in the surface of the substrate sheet 36 and filled with light-scattering material. A coating or film 40 applied on the surface of the substrate sheet 36 covers the light-scattering element 12gg. The coating or film 40 may be formed of, for example, a polymer having the same index of refraction as the substrate 36. Preferably, the coating or film 40 is made of the same material that forms the substrate 36. FIG. 10H illustrates a light-scattering element 12hh that is also created by a void formed in the surface of the substrate sheet 36a and filled with light-scattering material. Another substrate sheet 36b applied on the surface of the substrate sheet 36a covers the light-scattering element 12hh. The difference between the embodiments of FIGS. 10G and 10H is the thickness of the material used to cover the light-scattering element (for example, some covering material is not suited for forming a thin coating or film 40 as illustrated in FIG. 10G). FIG. 10I illustrates a light-scattering element 12ii formed by a variation in the boundary between the flat surface of the substrate sheet 36 and a coating 40. More specifically, the substrate sheet 36 includes a void filled by the coating 40. FIG. 10J illustrates a light-scattering element 12jj that is also formed by a void along the boundary between the surface of one substrate sheet 36a and another juxtaposed substrate sheet 36b. FIG. 10K illustrates a light-scattering element 12kk that is formed by a void etched on the surface of the substrate sheet 36. A coating or film 40 applied over the surface of the substrate sheet 36 encloses, but does not fill, the void. FIG. 10L also illustrates a light-scattering element 12ll formed by a void etched on the surface of the substrate sheet 36a. Another layer of a substrate sheet 36b juxtaposed against the substrate sheet 36a encloses, but does not fill, the void. FIG. 10M illustrates a light-scattering element 12mm that is formed completely inside the substrate sheet 36. For example, the element 12mm may be an air bubble placed inside the substrate sheet 36 formed by any suitable molding method. Alternatively, as illustrated in FIG. 10N, a light-scattering element 12nn located completely inside of the substrate sheet 36 may be formed by applying a laser beam to the substrate sheet 36 so as to modify the optical property of a portion of the substrate sheet 36. Specifically, as the laser propagates through the substrate sheet 36, its field becomes stronger (because of focusing) and locally modifies the index of refraction at a portion of the substrate sheet 36 to form the light-scattering element 12nn.

Obviously, these and other methods can be used to create a light-scattering element 12c on or in the substrate sheet 36 of the optical probe 10c of FIGS. 9A and 9B as well as in other embodiments of an optical probe of the type shown in FIGS. 2A, 2B, 4, 5, and 7A–7D, as appropriate.

Figures 11A, 11B:
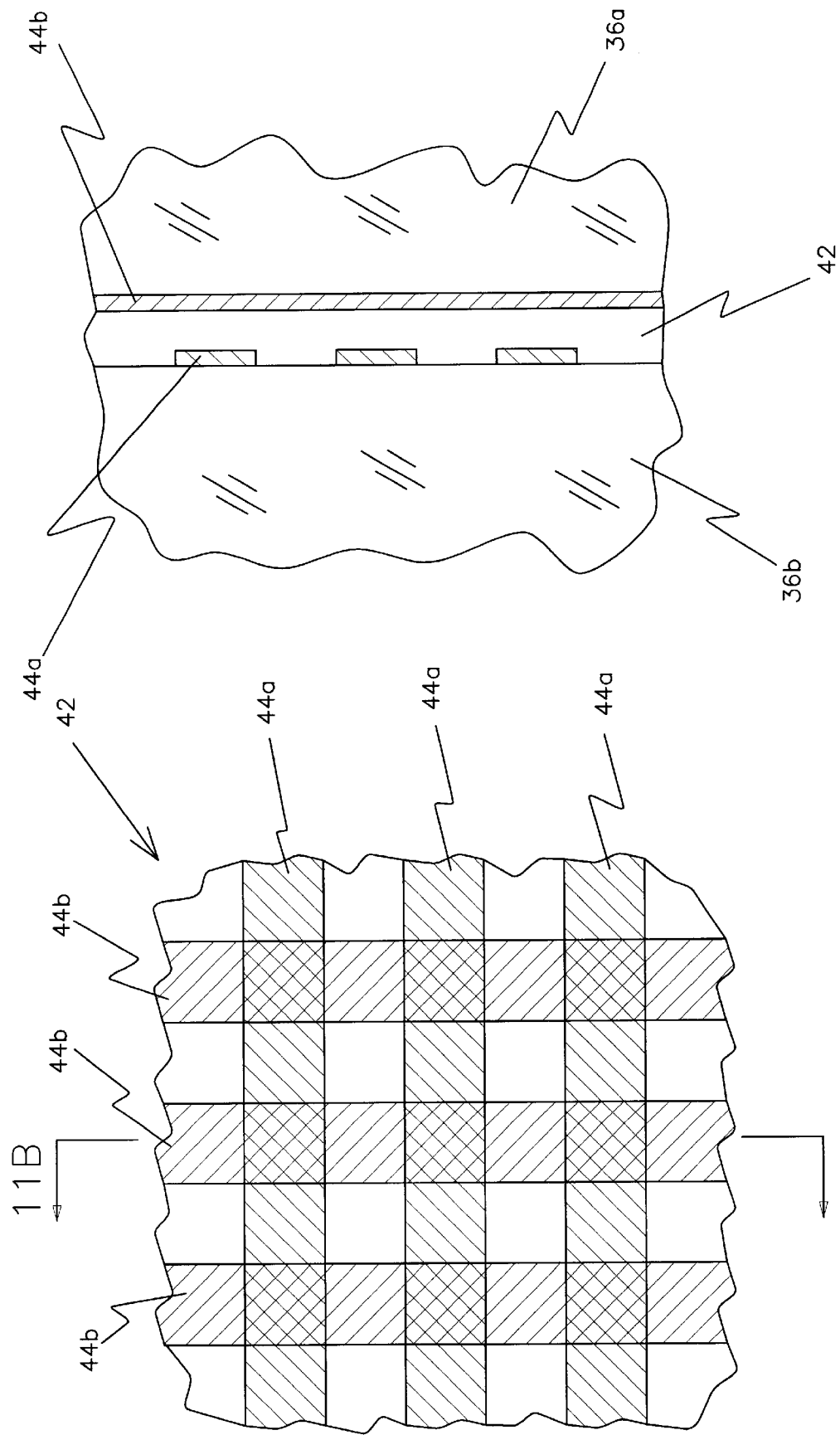
FIG. 11A is a schematic view of a substrate of the optical probe of FIGS. 9A and 9B, which includes a polymer dispersed liquid crystal (PDLC)
FIG. 11B is a cross-sectional view of the substrate of FIG. 11A.

Referring to FIGS. 11A and 11B, alternatively, the substrate sheet 36 of the optical probe 10c of FIGS. 9A and 9B may include polymer dispersed liquid crystal (PDLC) 42 formed of orthogonally arranged sets of horizontal transparent conductive strips 44a and vertical transparent conductive strips 44b, which form electrodes that selectively produce an electric field therebetween. As shown in FIG. 11B, the PDLC 42 is sandwiched between two layers 36a, 36b of material that jointly form the substrate sheet 36. The construction and operation of PDLC are well known in the art and, thus, are not described in detail here. Briefly, as applied in the present invention, when a pair of selected horizontal and vertical conductive strips 44a, 44b are energized, an electric field is created at the junction between the energized strips that causes the index of refraction at the junction to be different from other areas of the PDLC 42. Thus, the volume of the PDLC sandwiched between the two selected conductive strips 44a, 44b temporarily becomes a light-scattering element. Use of multiple horizontal and vertical conductive strips allows a user to selectively position a light-scattering element at selected locations in the substrate sheet 36 by selectively energizing the conductive strips 44a, 44b. Instead of PDLC, lead lanthanum zirconate titanate (PLZT) may be included in the substrate sheet 36. As known in the art to those familiar with PDLC and PLET, the construction and operation of a PLZT substrate are similar to a PDLC substrate, except that a PLZT substrate has faster reaction time, i.e., the volume between selected horizontal and vertical conductive strips obtains scattering property almost instantly upon application of power to the strips to create an electric field therebetween (on the order of nanoseconds).

Figure 12C:
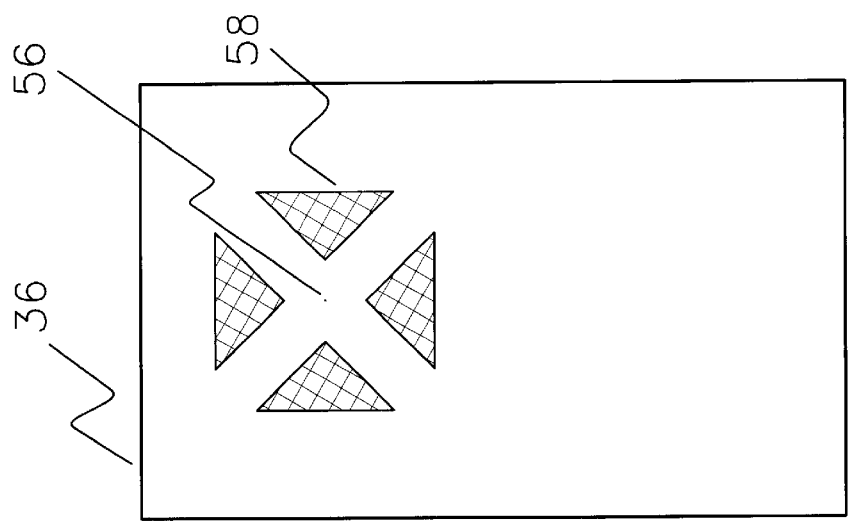
FIGS. 12A–12C illustrate further alternative embodiments of a substrate of the optical probe of FIGS. 9A and 9B.
Figure 12B:
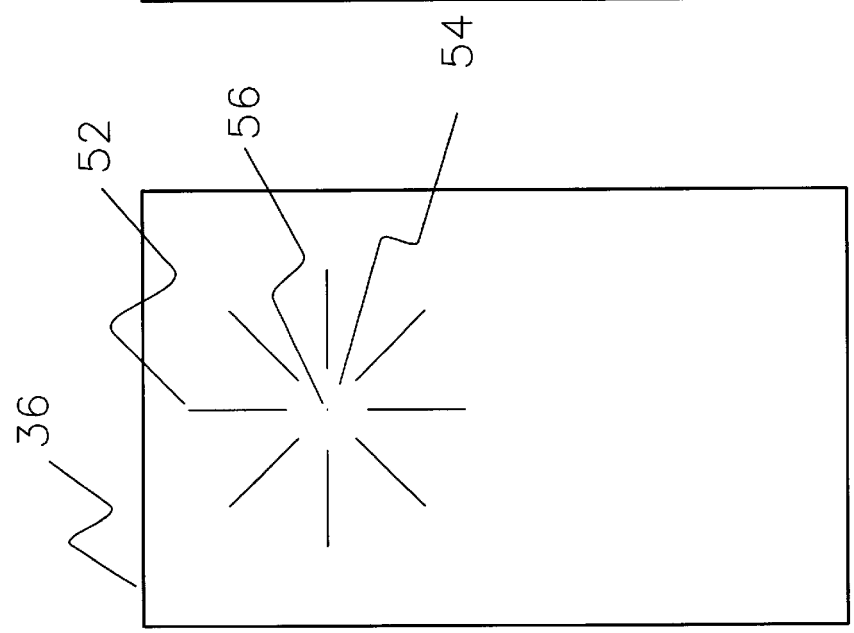
Figure 12A:
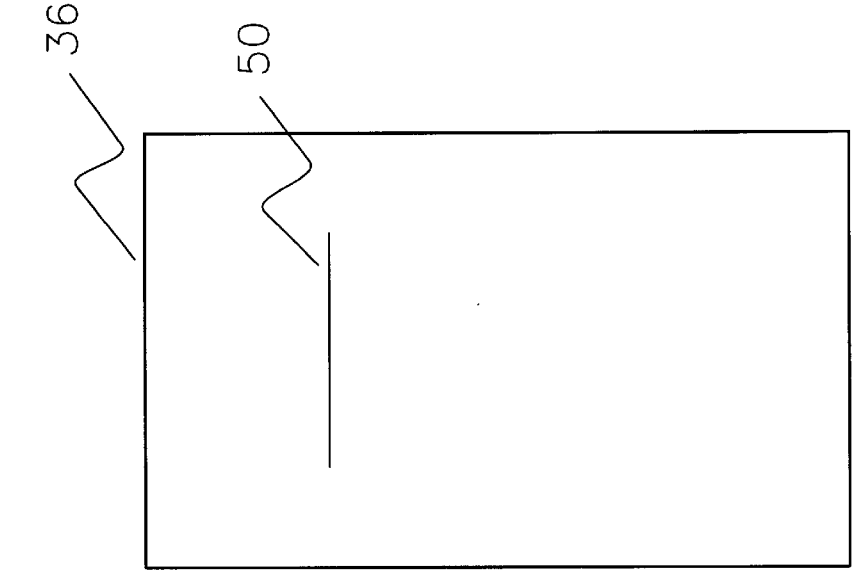

FIGS. 12A, 12B, and 12C illustrate further alternative embodiments of a substrate sheet 36 suitable for use in the optical probe 10c illustrated in FIGS. 9A and 9B. The substrate sheet 36 shown in FIG. 12A is formed of a sheet of, for example, glass having a light-scattering element 50 in the form of a line created on one surface of the sheet. The light-scattering element 50 may be formed using any of the methods described in FIGS. 10A through 10N above. Though the light-scattering element 50 is illustrated as a straight line, it may have other forms, such as a curved or waving line. In operation, as before, measuring the light scattered by, refracted by, and/or reflected from the light-scattering element 50 and received by the aperture stop and the light-measuring device allows the intensity and/or intensity distribution in the light incident on the substrate sheet 36 to be ascertained. Specifically, in this embodiment the light intensity is integrated along the light-scattering element 50 in a fashion similar to a slit scanner.

In FIG. 12B, the surface of a substrate sheet 36 includes a plurality of radially extending linear light-scattering markings 52. The inner ends of the radial markings 52 are spaced apart from each other so as to leave a generally circular space 54. A light-scattering element 56 is located at the center of the circular space. The markings 52 and the light-scattering element 56 may be formed using any of the methods described above in reference to FIGS. 10A through 10N. In operation, the radially extending markings 52 are used to locate the position of the light-scattering element 56, which scatters, refracts, and/or reflects incident light in the manner previously described. Specifically, moving the substrate sheet 36 around with respect to the incident light and observing the light scattered by, refracted by, and/or reflected from the plurality of markings 52 and collected by the light-measuring device allows a user to locate and accurately position the light-scattering element 56. This embodiment is preferable when the light-scattering element 56 is very small and difficult to locate.

FIG. 12C illustrates a substrate sheet 36, which is similar to the substrate sheet 36 of FIG. 12B, except that the substrate sheet 36 shown in FIG. 12C includes a plurality of triangular light-scattering marking patches 58 instead of a plurality of radial linear markings. As before, the light-scattering marking patches 58 may be formed of any of those described in FIGS. 10A through 10N. As before, a light-scattering element 56 is located radially inward of the plurality of light-scattering patches 58, and the patches 58 serve to assist a user in locating the light-scattering element 56.

The light-scattering linear or patch markings illustrated in FIGS. 12B and 12C may be used in combination with the PDLC or PLZT technology illustrated in FIGS. 11A and 11B and described above. Specifically, arranging to selectively activate each of the linear or patch markings to obtain light-scattering property using PDLC or PLZT technology and monitoring the light-scattering pattern allow a user to more easily locate the centrally located light-scattering element 56.

FIGS. 13A through 13D illustrate a further alternative embodiment of an optical probe 10d formed in accordance with the present invention. The optical probe 10d shown in FIGS. 13A–13B includes a sheet 60 of, for example, glass. The sheet 60 includes a sloped edge 62 that serves as a light-scattering element, a front surface 64, and a back surface 66. The thickness "T" of the sheet 60 may be made less than 1 mm. A limiting aperture 14d and a light-measuring device 15d are located at one end of the sheet 60 remote from the sloped edge 62. Similarly to the optical probe 10c described in reference to FIGS. 9A–9C above, the sheet 60 of the optical probe 10d of this embodiment serves as a waveguide to direct the light reflected from the sloped edge 62 toward the aperture 14d and the light-measuring device 15d. Also as before, the sheet 60 is supported by a frame 68.

Figure 13D:
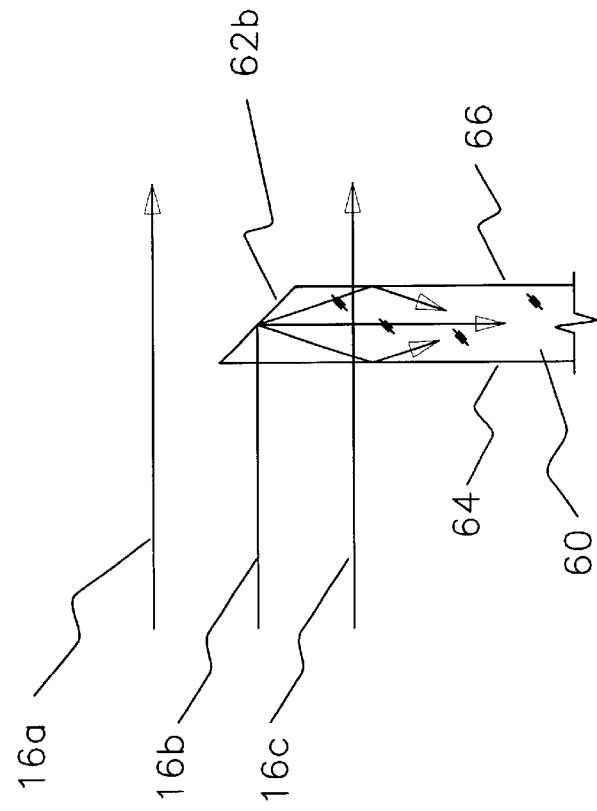
FIGS. 13C and 13D are enlarged views of the circled section "FIG. 13C, FIG. 13D" included in FIG. 13B.
Figure 13C:
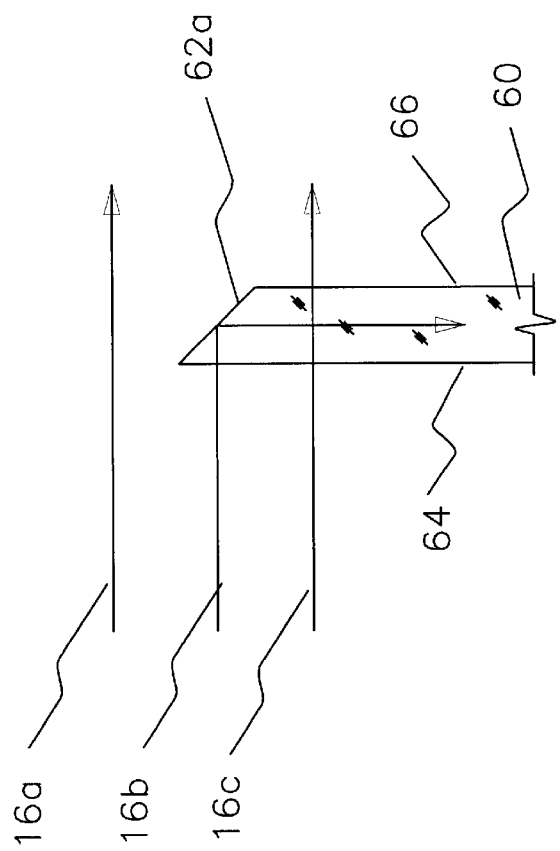

FIGS. 13C and 13D illustrate variations in the sloped edge 62 shown in FIGS. 13A and 13B. In FIG. 13C, sloped edge 62a is polished and forms a light-scattering element. In operation, as shown in FIG. 13C, incident light beams 16a and 16c that do not impinge on the sloped edge 62a propagate without being affected by the sheet 60. In contrast, light beam 16b that enters the sheet 60 through the front surface 64 and impinges on the sloped edge is reflected from the polished sloped edge 62a. Such light beams are guided through the sheet 60 to the aperture stop 14d and to the light-measuring device 15d. As before, measuring the power of light collected by the light-measuring device 15d, allows the intensity of the light that is incident on the polished sloped edge 62a to be obtained. Moving the sheet 60 and, hence, the polished sloped edge 62a with respect to the incident light 16, allows the intensity distribution in the incident light 16 to be measured. Because the polished sloped edge 62a is sensitive to the angle of the light incident thereon, this embodiment of the invention is preferably used when the incident beam is collimated.

In FIG. 13D, the sloped edge 62b is finely ground. The operation of the sloped edge 62 in FIG. 13D is the same as the operation of the polished sloped edge 62a in FIG. 13C. A finely ground sloped edge 62b is preferable when the incident beam is not collimated. In such a case, the finely ground sloped edge 62b randomly scatters or reflects the uncollimated light beam so that the light is efficiently transferred to the aperture stop 14d and to the light-measuring device 15d. More specifically, as shown in FIG. 13D, while the incident light beams 16a and 16c that do not impinge on the sloped edge 62b propagate without being affected by the fine grinding, the light beams 16b that impinge on the finely ground sloped edge 62b are randomly scattered by and/or reflected by the fine grinding. The randomly scattered and/or reflected light beams are further reflected from the front surface 64 and the back surface 66 of the sheet 60 toward the aperture stop 14d and to the light-measuring device 15d.

FIGS. 14–20 illustrate microversions of an optical probe formed in accordance with the present invention. Micro-optical probes may be fabricated using micromachining technique as known in the art of micro-optics, such as microelectromechanical-systems (MEMS) technique, Multi-User MEMS Processes (MUMPs), surface-micromachining technique, micro-optics fabrication technology, microhinge technology, "LIGA" process (Lithografie, Galvanik, Abformung in German, meaning lithography, electroforming, and injection molding), and surface-micromachined free-space micro-optical bench (FSMOB). Micromachining can be used to inexpensively produce various micro-optical components employed in optical probes formed in accordance with this invention. Micromachining can also be used to monolithically integrate various micro-optical systems on a single silicon substrate ("Si substrate"). Micromachining allows micro-optical probes formed in accordance with the present invention to be fabricated in micron size. The MEMS Technology Application Center at North Carolina (MCNC) operating under Defense Advanced Research Projects Agency (DARPA)-supported MUMPs is one suitable micromachining location. Some details of micromachining technique, in particular MEMS and MUMPs, can be found in "Scanning and Rotating Micromirrors Using Thermal Actuators", J. T. Butler et al., *Optical Scanning Systems: Design and Applications*, L. Beiser, S. F. Segan, editors, Proc. SPIE Vol. 3131, pp. 134–144 (1997); "Self-Assembled Microactuated XYZ stages for Optical Scanning and Alignment", Li Fan et al., *Transducers '97 International Conference on Solid-State Sensors and Actuators*, Vol. 1, pp. 319–322 (1997); "Micro-actuated Micro-XYZ Stages for Free-Space Micro-Optical Bench", L. Y. Lin et al., *MEMS '97 IEEE 10th Annual International Workshop on Micro Electro Mechanical Systems*, pp. 43–48 (1997); "Out-of-Plane Refractive Microlens Fabricated by Surface Micromachining", C. R. King et al., *IEEE Photonics Technology Letters*, Vol. 8(10), pp. 1349–1351 (October 1996); and "Micromachined free-space integrated micro-optics", M. C. Wu et al., *Sensors and Actuators A: Physical*, Vol. 50(1–2), pp. 127–134 (August 1995).

Figure 14:
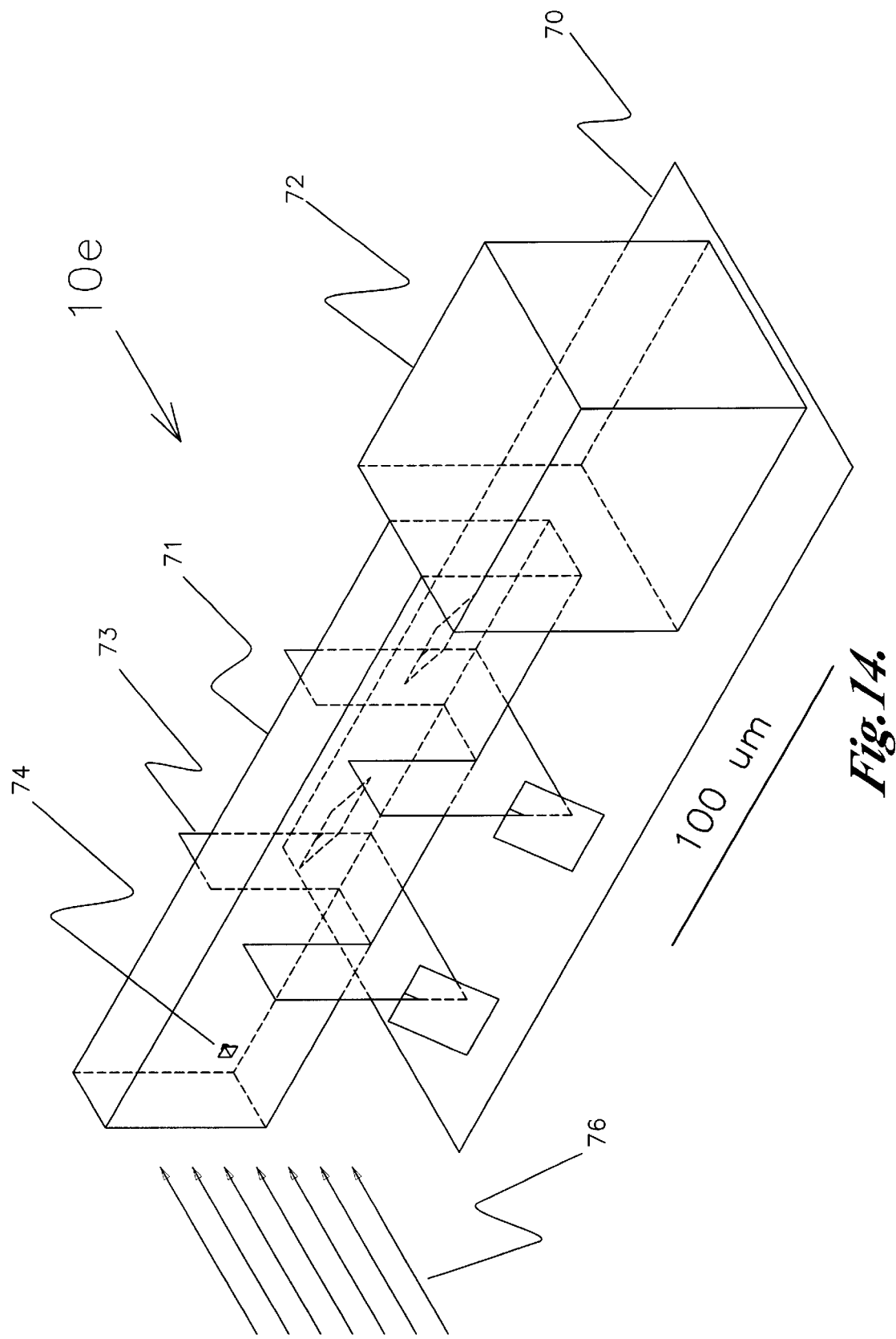
FIG. 14 is a micro-optical probe formed in accordance with the present invention, similar to the optical probe of FIGS. 9A and 9B.

FIG. 14 illustrates a micro-optical probe 10e formed in accordance with the present invention, which is similar to the optical probe 10c illustrated in FIGS. 9A and 9B and described above, but smaller in scale. The micro-optical probe 10e illustrated in FIG. 14 includes a Si substrate 70. A substrate sheet 71 and a light-measuring device 72 are mounted on the Si substrate 70. In the illustrated embodiment, an aperture stop (not separately shown) is integrally formed with the light-measuring device 72. The substrate sheet 71 is supported by a couple of precision optical mounts 73 mounted on the Si substrate 70. The substrate sheet 71 is single-crystal silicon and includes a light-scattering element 74 that comprises a void in the shape of a pyramid, formed using anisotropic etching.

In operation, as with the previously described embodiments of the invention, the micro-optical probe 10e illustrated in FIG. 14 is exposed to an incident light beam 76. Some of the incident light beam 76 strikes the light-scattering element 74 and is scattered by, refracted by, and/or reflected from the light-scattering element 74. This light is directed by the substrate sheet 71 to the aperture stop 69 and to the light-measuring device 72. Measuring the light detected by the light-measuring device 72 allows the intensity and/or intensity distribution of the incident light beam 76 to be ascertained.

A small-scale micro-optical probe of the type illustrated in FIG. 14 and described above can be readily placed in limited or hard-to-reach spaces. Further, such a probe can be readily incorporated into various types of optical devices.

Figure 15:
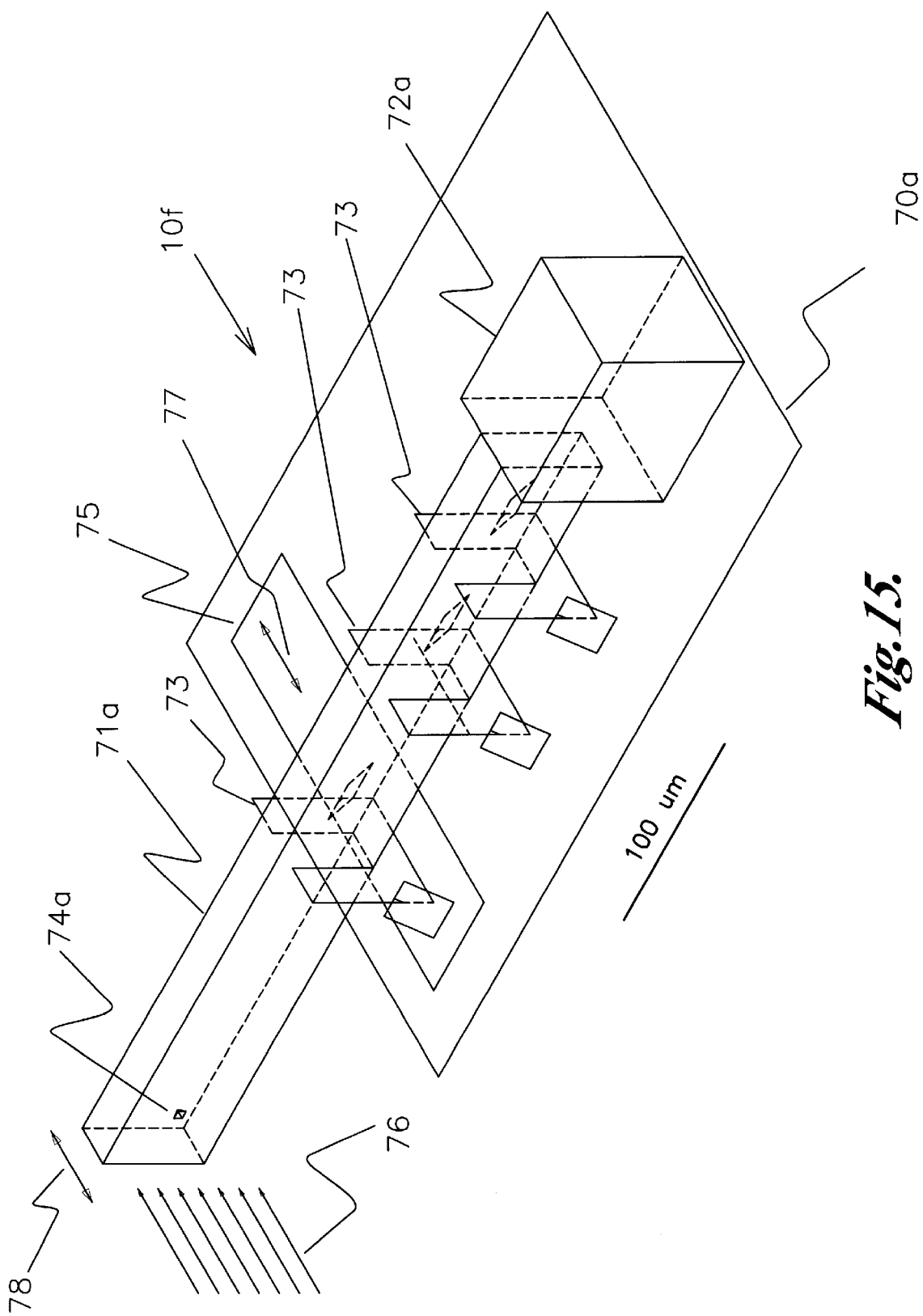
FIG. 15 illustrates a modification of the micro-optical probe of FIG. 14 that includes a microactuator.

FIG. 15 illustrates a modification of the micro-optical probe 10e of FIG. 14. The modification is the inclusion of a microactuator for moving the light-scattering element with respect to the incident light to measure the intensity distribution within the light. More specifically, FIG. 15 illustrates a micro-optical probe 10f that includes a Si substrate 70a, on which a substrate sheet 71a and a light-measuring device 72a are mounted. As in the embodiment of the invention illustrated in FIG. 14, the substrate sheet 71a is a single-crystal silicon and includes a light-scattering element 74a that comprises a void in the shape of a pyramid, which is to be exposed in the propagation path of the incident light beam 76. One end of the substrate sheet 71a closer to the light-measuring device 72a defines an aperture stop 69a. The micro-optical probe 10f illustrated in FIG. 15 also includes a microactuator 75 mounted on the Si substrate 70a.

Preferably, the microactuator 75 utilizes ohmic heating to generate thermal expansion, which creates movement of objects attached to the actuator, as well known in the microactuator art. Such a microactuator fabricated using the MUMPs process and employing drive voltages of less than 5 volts is capable of providing deflections of greater than 10 microns. In operation, the microactuator 75 is mounted to move (or oscillate) the substrate sheet 71a in the direction of arrow 77, i.e., in a direction orthogonal to the longitudinal axis of the substrate sheet 71a. This action moves the substrate sheet 71a including the light-scattering element 74a in the direction of arrow 78, i.e., in a direction generally parallel to arrow 77. Moving the light-scattering element 74a with respect to the incident light beam 76 in this manner allows a user to measure the intensity distribution in the incident beam 76 by observing the light collected by the light-measuring device 72a as the light-scattering element is moved.

Figure 16:
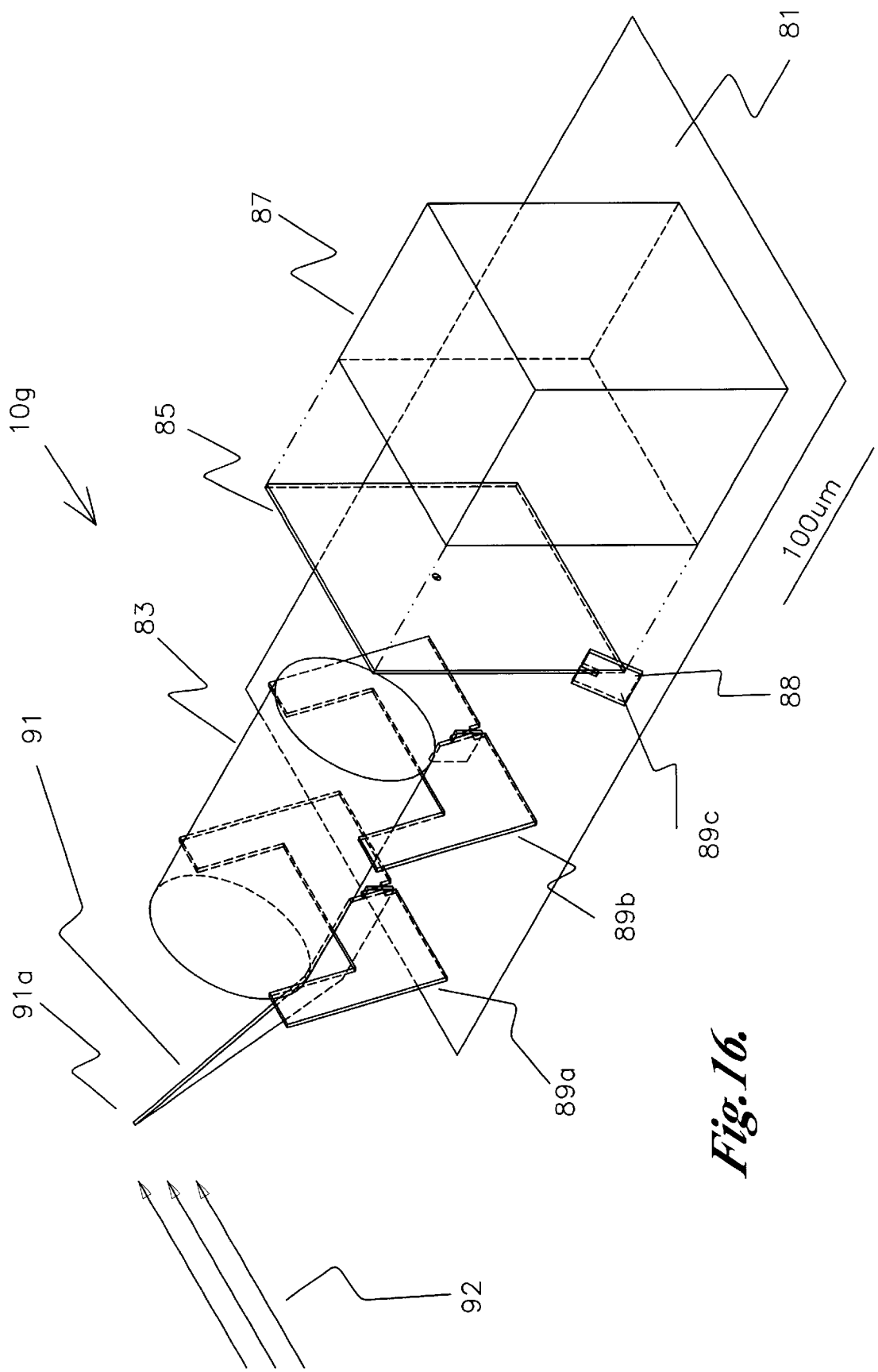
FIG. 16 illustrates an alternative embodiment of a micro-optical probe formed in accordance with the present invention, similar to the optical probe of FIGS. 8A and 8B.

FIG. 16 illustrates a microversion of the optical probe 10b illustrated in FIGS. 8A and 8B and described above. The micro-optical probe 10g illustrated in FIG. 16 includes a Si substrate 81, on which a graded refractive index rod lens ("GRIN-rod lens") 83, an aperture stop 85, and a light-measuring device 87 are mounted using various optical mounts 89a, 89b, 89c. A GRIN-rod lens suitable for use in this embodiment is SELFOC® lens available from Nippon Sheet Glass (NSG) America, Inc. of NJ. An elongated support in the form of a thin wire 91 extends from one end of the GRIN-rod lens 83 so that its tip 91a is located along or adjacent the optical axis of the GRIN-rod lens 83. In operation, an incident light beam 92 striking the tip 91a of the wire 91 is scattered by, refracted by, and/or reflected from the tip 91a toward the GRIN-rod lens 91. Light received by the GRIN-rod lens is directed by the GRIN-rod lens toward the aperture stop 85. As with the embodiment of the invention illustrated in FIGS. 8A and 8B, the GRIN-rod lens 83 and the aperture stop 85 cooperatively isolate the light scattered by, refracted by, and/or reflected from the tip 91a of the wire 91 from the light scattered by, refracted by, and/or reflected from other portions of the wire 91. The thusly isolated light is collected by the light-measuring device 87 to determine the intensity and/or intensity distribution of the incident light beam 92.

Figure 17:
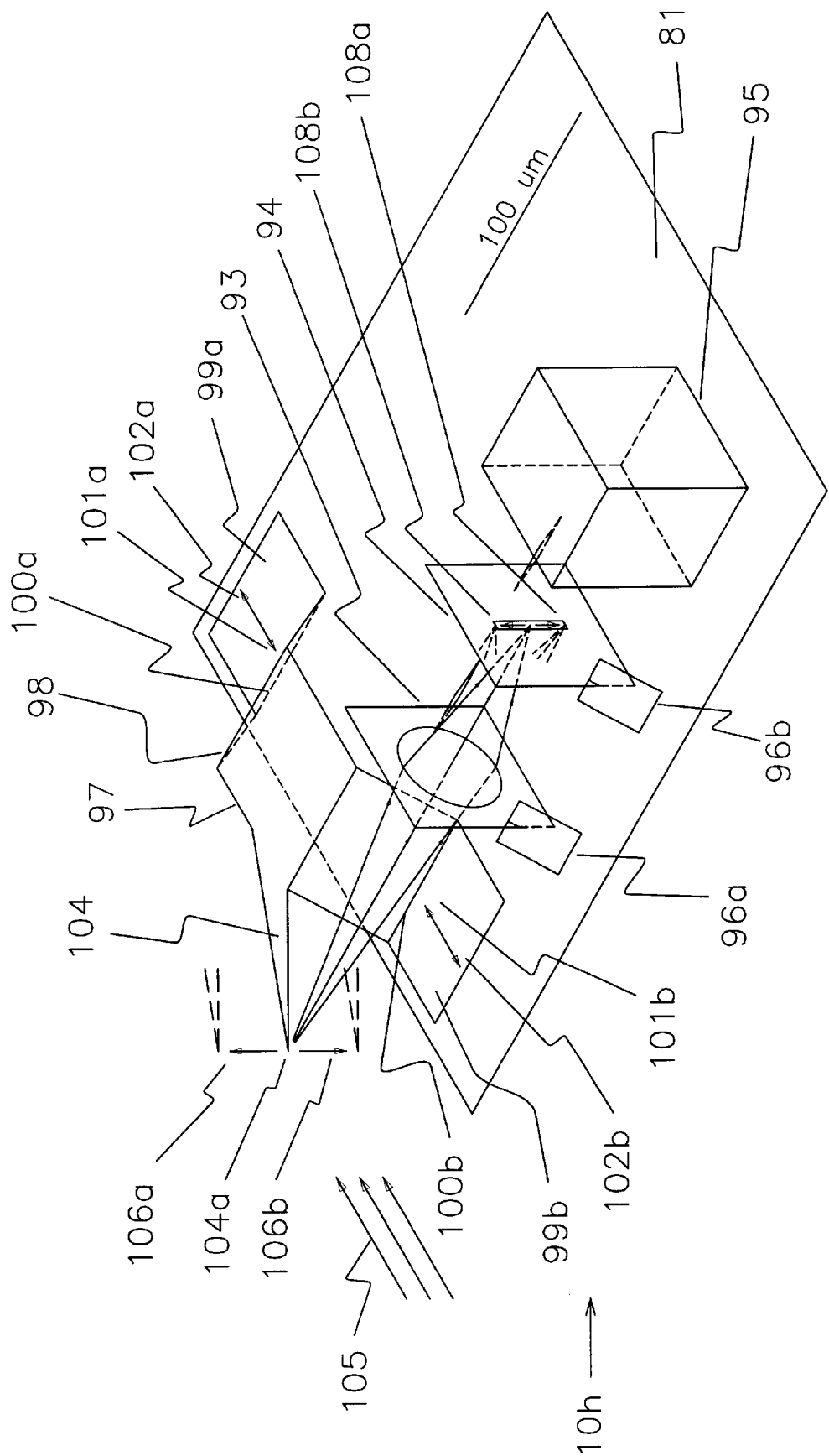
FIG. 17 illustrates yet another embodiment of a micro-optical probe formed in accordance with the present invention, including a one-dimensional (1D) optical actuator.

FIG. 17 illustrates yet another embodiment of a micro-optical probe 10h formed in accordance with this invention. The micro-optical probe 10h shown in FIG. 17 includes a Si substrate 81, on which a lens 93, an aperture stop 94, and a light-measuring device 95 are mounted using optical mounts 96a, 96b. The aperture stop 94 is formed by a slit, as illustrated. The micro-optical probe 10h illustrated in FIG. 17 further includes a one-dimensional (1D) optical actuator 97, as known in the art, which is mounted on the Si substrate 81. As will be better understood from the following description, the 1D optical actuator 97 vertically moves a light-scattering element with respect to an incident light beam so that the intensity distribution in the light beam can be measured.

The 1D optical actuator 97 includes a platform 98 and a pair of actuator plates 99a and 99b, which are located on opposite sides of and coupled to the platform 98 by a pair of side support plates 100a, 100b, respectively. The actuator plates 99a, 99b, the side support plates 100a, 100b and the platform 98 are joined together by polarity hinges and slide joints, as known in the art. The platform 98 includes a coplanar, outwardly extending elongated support arm 104. The elongated support arm 104 terminates at a tip 104a, which functions as a light-scattering element in this embodiment of the invention. As with the embodiment of the invention illustrated in FIG. 15 and described above, the actuator plates 99a, 99b may be formed by microactuators that utilize ohmic heating to create thermal expansion and, thus, mechanical movement of an object attached to the actuator.

In operation, the platform 98 and, hence, the tip 104a of the elongated support 104 can be raised in the direction of an arrow 106a, i.e., in a direction orthogonal to the plane of the platform 98, by moving the actuator plates 99a, 99b toward each other in the directions of arrows 101a and 101b, respectively, at the same speed using an electrostatic scratch drive (not shown). Similarly, the tip 104a can be lowered in the opposite direction (arrow 106b) when the actuator plates 99a, 99b are moved away from each other in the directions of arrows 102a, 102b, respectively, at the same speed. As with other embodiments of the invention described above, the lens 93 and the aperture stop 94 coact to isolate the light scattered by, refracted by, and/or reflected from the tip 104a (the light-scattering element) of the elongated support 104 from the light scattered by, refracted by, and/or reflected from other portions of the elongated support 104.

When the tip 104a is at its highest position (at the tip of arrow 106a), the light scattered by, refracted by, and/or reflected from the tip 104a is transmitted by the lens 93 to the lowest portion of the aperture stop 94 represented by the tip of an arrow 108a. Likewise, when the tip 104a is at its lowest position (at the tip of arrow 106b), the light scattered by, refracted by, and/or reflected from the tip 104a is transmitted by the lens 93 to the highest portion of the aperture stop 94, represented by the tip of an arrow 108b. The light thusly isolated by the lens 93 and the aperture stop 94, as the tip 104a is moved up and down, is collected by the light-measuring device 95. The collected light is used to measure the intensity distribution in the incident light beam 105. The tip 104a of the 1D optical actuator 97 shown in FIG. 17 is optically aligned with the lens 93, the aperture stop 94, and the light-measuring device 95 mounted on the Si substrate 81 so that the light transmitted from the tip 104a, as the tip 104a is moved up and down, is precisely directed toward the aperture stop 94 and then to the light-measuring device 95. In this embodiment, the light-scattering element (the tip 104a) and the aperture stop 94 are not in fixed relationship as the tip 104a is moved up and down. For example, between where the tip 104a is at its highest position and where the tip 104a is at its midlevel point, the distance between the tip 104a and the aperture stop 94 varies. This is acceptable because the tip 104a and the aperture stop 94 are in controlled relationship as long as the light-measuring device 95 is large enough to gather the light transmitted from any point along the aperture stop 94.

Figure 18:
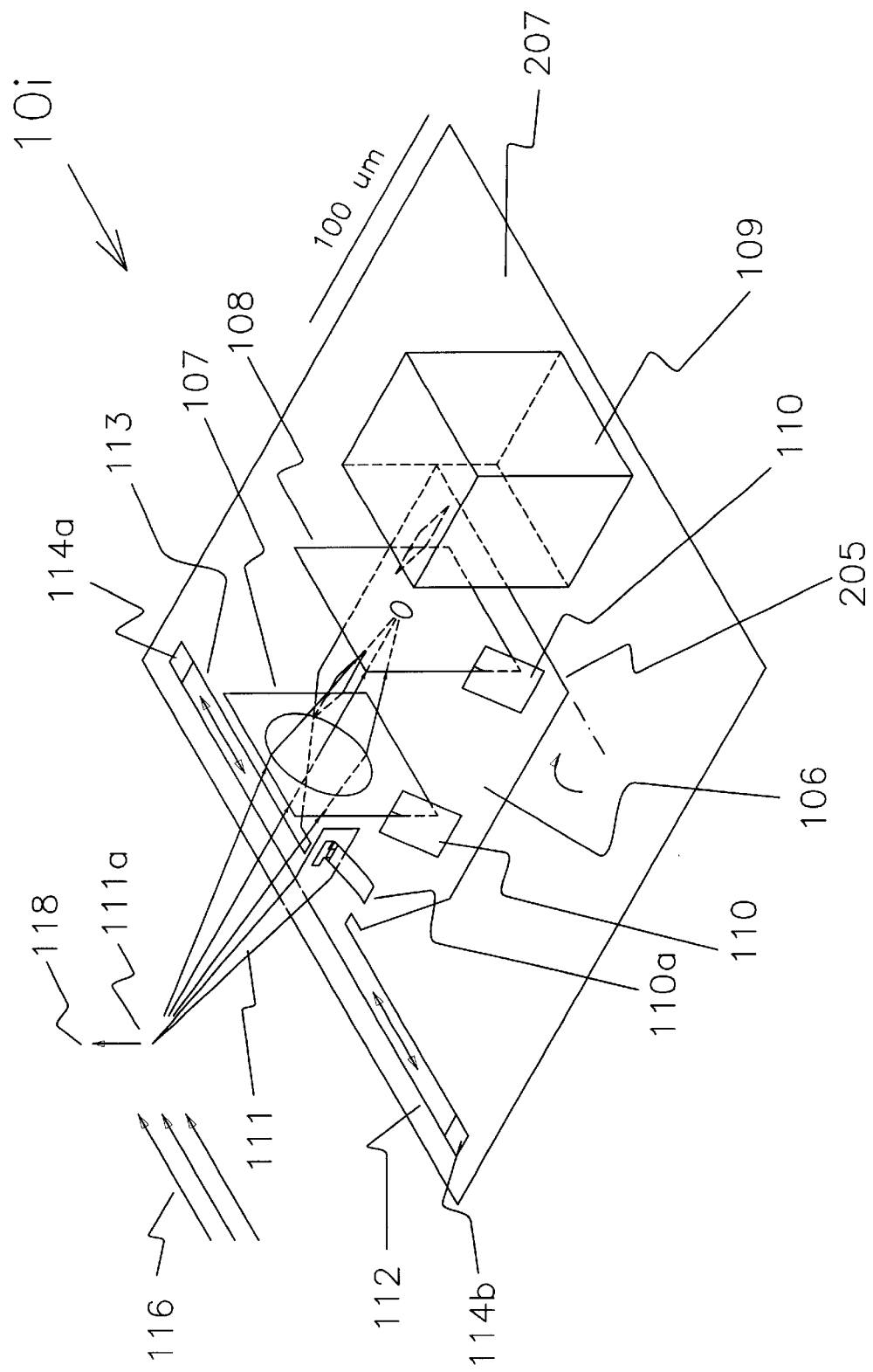
FIG. 18 illustrates a modification of the micro-optical probe of FIG. 17.

FIG. 18 illustrates a modified version of the micro-optical probe 10h illustrated in FIG. 17. The modification involves a different type of a microactuator. More specifically, the micro-optical probe 10i illustrated in FIG. 18 includes a silicon (Si) base substrate 207, to which a Si substrate 106 is attached by means of a one-dimensional (1D) actuator 112 and hinge 205. A light-measuring device 109 is also mounted on the Si base substrate 207. A lens 107, an aperture stop 108, and an elongated support 111 are mounted on the Si substrate 106 using optical mounts 110, 110a. The elongated support 111 includes a tip 111a that forms a light-scattering element. The 1D optical actuator 112, called a buckle bar, includes an elongated bar 113 and a pair of anchors 114a, 114b. The pair of anchors are located at opposite ends of the elongated bar 113. The longitudinal axis of the elongated bar 113 and the pair of anchors 114a, 114b lies orthogonal to the optical axis defined by the lens 107, the aperture stop 108, and the light-measuring device 109.

The 1D optical actuator 112 is integrally formed with the Si substrate 106 so that the entire optical probe 101 structure is arcuately moved when the 1D optical actuator 112 is energized by applying a potential across the anchors 114a, 114b, which causes the elongated bar 113 to expand due to ohmic heating, which in turn cause the elongated bar to buckle, thus raising one end of the Si substrate 106.

In operation, the elongated bar 113 moves upwardly as described above. When this occurs, the tip 111a is raised as shown by an arrow 118. The tip 111a is lowered by reducing the potential between the pair of anchors 114a, 114b, to thereby contract the elongated bar 113. As before, the light scattered by, refracted by, and/or reflected from the tip 111a is transmitted through and isolated by the combination of the lens 107 and the aperture stop 108, and is directed by these elements to the light-measuring device 109 for intensity measurement. Moving the tip 111a up and down using the 1D optical actuator 112 allows the intensity distribution within the incident light 116 to be measured. The tip 111a, the lens 107, and the aperture stop 108, all mounted on the Si substrate 106, remain in optical alignment as the tip 111a is moved up and down.

In operation, the aperture stop 108 moves in a controlled relationship with respect to the light-measuring device 109. Such motion can potentially cause a repeatable change in optical power transfer from the aperture stop 108 to the light-measuring device 109. This change may be negligible, and may be calibrated if not negligible.

Figure 19:
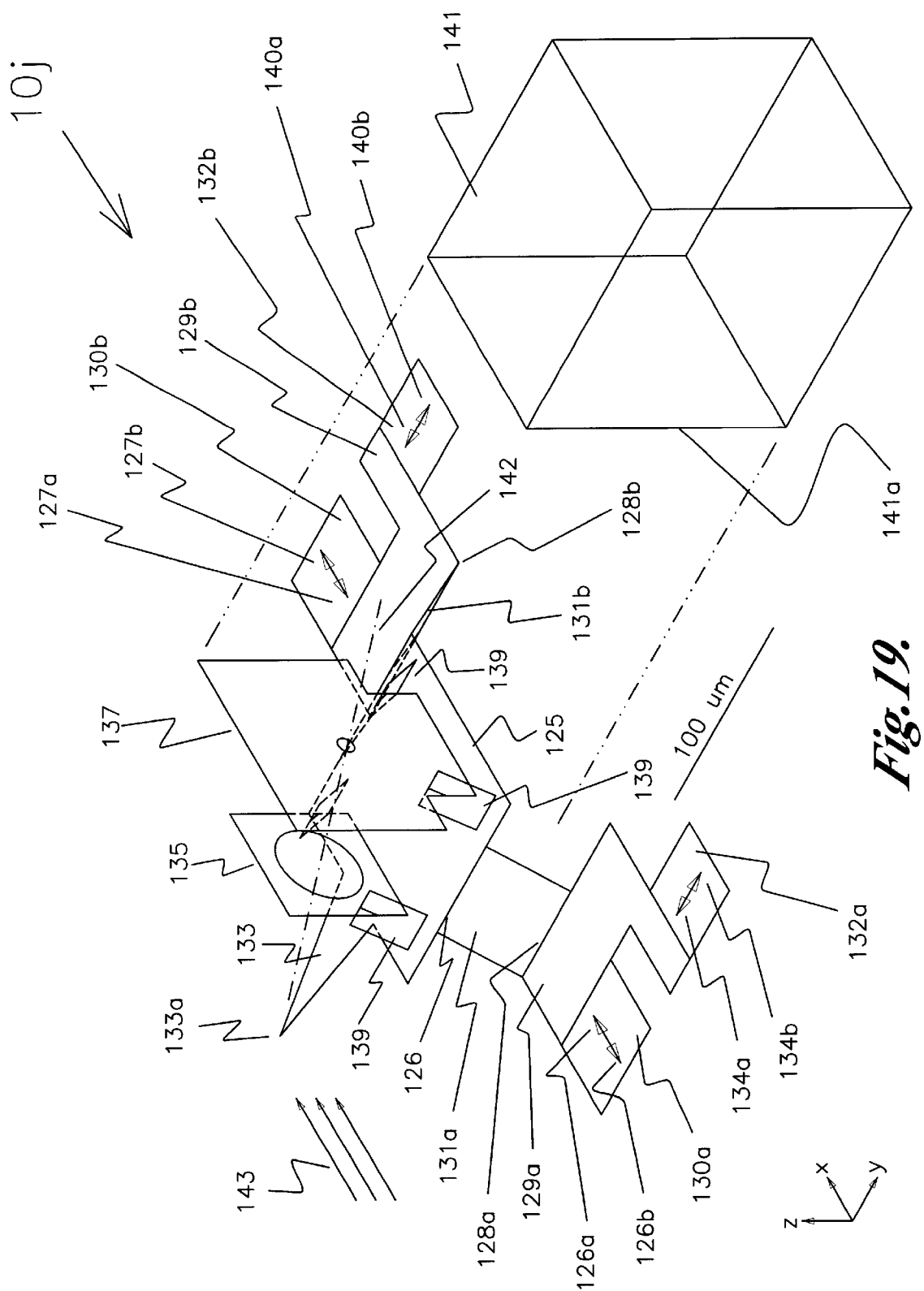
FIG. 19 illustrates a further alternative embodiment of a micro-optical probe formed in accordance with the present invention, including a three-dimensional (3D) optical actuator.

FIG. 19 illustrates a further alternative embodiment of a micro-optical probe formed in accordance with the present invention. The micro-optical probe 10j illustrated in FIG. 19 includes a three-dimensional (3D) optical actuator 125 that includes a platform 126 and a pair of side support plate assemblies 128a, 128b, coupled to opposing sides of the platform 126. The side plate assemblies 128a, 128b each include a side plate 129a, 129b and an inclined plate 131a and 131b. The inclined plates join associated side plates to the platform 126. The 3D optical actuator 125 further includes a pair of X-axis actuator plates 130a, 130b and a pair of Y-axis actuator plates 132a, 132b. One pair of X- and Y-axis actuator plates 130a, 132a is coupled to orthogonal edges of one of the side plates 129a, while the other X- and Y-axis actuator plates 130b, 132b are coupled to orthogonal edges of the other side plate 129b. As before, these various plates are joined together by hinges and slide joints, as required. The direction of movement of the X-axis actuator plates 130a, 130b is orthogonal to the optical axis of the lens, aperture stop and light-measuring device described below and the direction of movement of the Y-axis actuator plates 132a, 132b is parallel to the optical axis.

The platform 126 includes a coplanar, outwardly extending, elongated support 133 that includes a tip 133a. The tip 133a forms a light-scattering element. Further, a lens 135 and an aperture stop 137 are mounted on the platform 126 using optical mounts 139. As illustrated, the tip 133a, the lens 135, and the aperture stop 137 are optically aligned along an optical axis 142 so that some of the light scattered by, refracted by, and/or reflected from the tip 133a will be directed toward and isolated by the combination of the lens 135 and the aperture stop 137. The micro-optical probe 10j illustrated in FIG. 19 further includes a light-measuring device 141 that includes a detection surface 141a, placed near the 3D optical actuator 125 (shown apart for clarity of illustration).

In operation, when the tip 133a lies in the propagation path of an incident light beam 143, some of the light is scattered by, refracted by, and/or reflected from the tip 133a. Some of this light is received and isolated by the lens 135 and the aperture stop 137, and directed toward the light-measuring device 141 for intensity measurement. The 3D optical actuator is designed to freely move the tip 133a in all three dimensions so that the intensity distribution can be measured in all areas of the beam rather than just along a line as in other embodiments of the invention. Specifically, the platform 126, and thus the tip 133a, is lifted vertically (in the Z-axis direction) by moving the X-axis actuator plates 130a, 130b toward each other as shown by arrows 126a, 127a, respectively. The platform 126, and thus the tip 133a, is lowered by moving the X-axis actuator plates 130a, 130b away from each other as shown by arrows 126b, 127b, respectively. The platform 126, and thus the tip 133a, is moved laterally in the X-axis direction by moving the X-axis actuator plates 130a, 130b in the same direction at the same speed as shown by arrows 126a, 127b, respectively, or as shown by arrows 126b, 127a, respectively. Further, the platform 126, and thus the tip 133a, is moved laterally in the Y-axis direction by moving the Y-axis actuator plates 132a, 132b in the same direction at the same speed as shown by arrows 134a, 140a, respectively, or as shown by arrows 134b, 140b, respectively. Thus, manipulating the X- and Y-axis actuator plates 130a, 130b, 132a, 132b positions the platform 126, and thus the tip 133a, in any position in the light beam 143.

Using the same principle employed in the 1D- and 3D actuators as described above, those skilled in the art may construct and employ a suitable 2D-actuator in conjunction with an optical probe of the present invention.

As in FIG. 18, in operation the aperture stop 137 moves in a controlled relationship with respect to the light-measuring device 141. Thus, as before, any change in power transfer from the aperture stop 137 to the light-measuring device 141 may be calibrated if not negligible.

Figure 20:
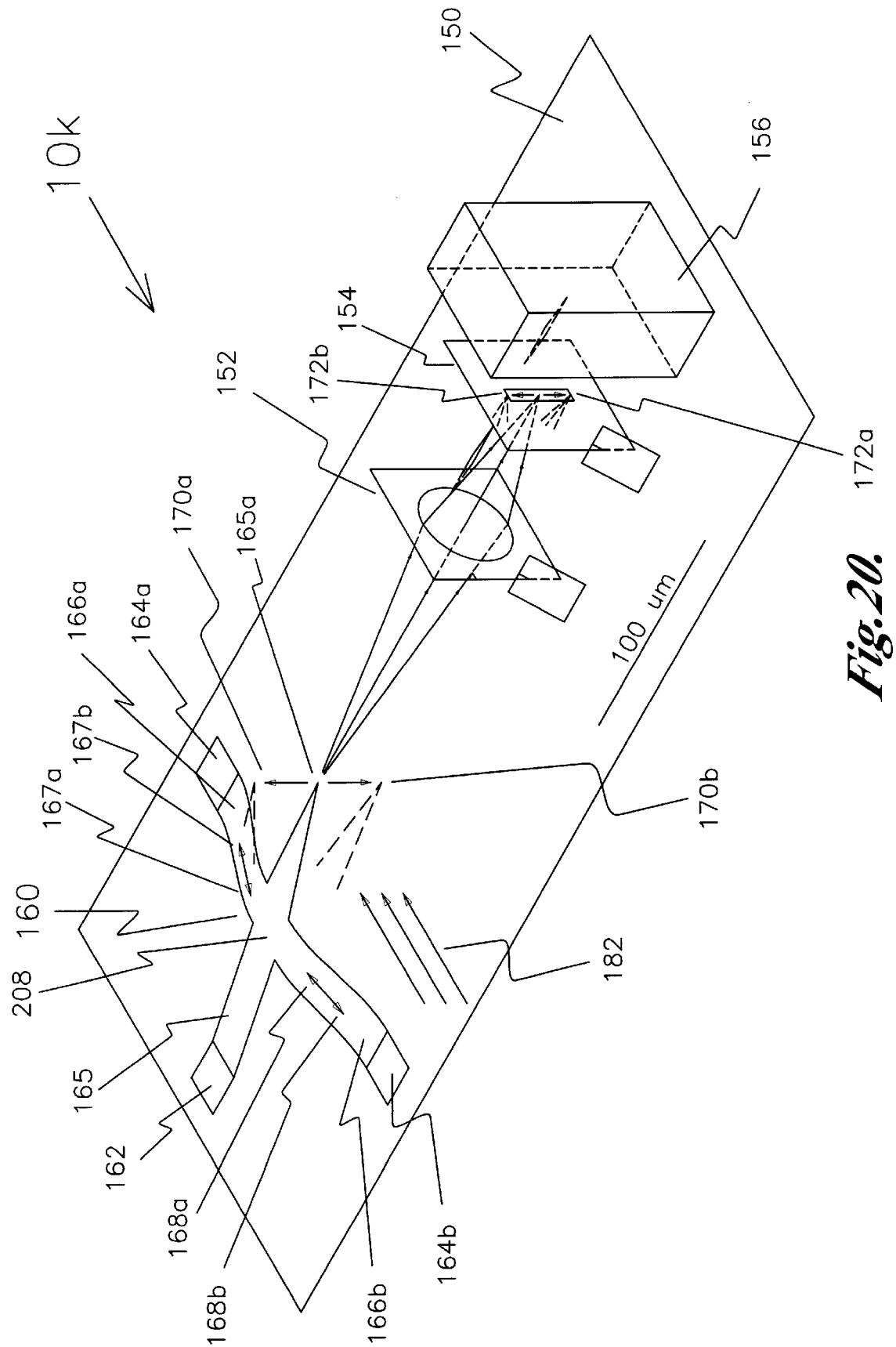
FIG. 20 illustrates a still further alternative embodiment of a micro-optical probe formed in accordance with the present invention, including a buckle bar actuator.

FIG. 20 illustrates a still further alternative embodiment of a micro-optical probe formed in accordance with the present invention. The micro-optical probe 10k illustrated in FIG. 20 includes a Si substrate 150, on which a lens 152, an aperture stop 154, and a light-measuring device 156 are mounted. Like the micro-optical probe 10h illustrated in FIG. 17 and described above, the aperture stop 154 has the form of a slit. The micro-optical probe 10k illustrated in FIG. 20 further includes a generally cross-shaped buckle bar actuator 160. The buckle bar actuator 160 includes a cross-shaped support structure 208 attached to the Si substrate 150 at anchors 162, 164a, 164b. The cross-shaped support structure 208 comprises a bar having a pair of arms 166a and 166b, electrically connected to anchors 164a, 164b, and a scatterer support 165. One end of the scatterer support 165 is attached to the anchor 162 and the other end forms a light-scattering element 165a. Anchor 162 is insulated except for its connection to the scatterer support 165. Thus, when the actuator is energized, as in FIG. 18, by applying a potential across anchors 164a, 164b, only the arms 166a and 166b of the bar will buckle due to ohmic heating as no current flows through the scatterer support 165. Arrows 167a, 167b, 168a, 168b, depict thermal expansion and contraction due to ohmic heating (and cooling) of the arms 166a and 166b of the bar. The thermal expansion causes the scattering element 165a to move in the direction of the upward arrow 170a. When the potential between the anchors 164a, 164b is reduced, the arms 166a and 166b of the bar contract, moving the scattering element 165a in the direction of the downward arrow 170b. It should be noted that the scatterer support 165 flexes in operation. Because anchor 162 is electrically insulated, it may comprise a hinge to avoid flexure of the scatterer support 165, if desired.

In operation, when a light beam 182 strikes the light-scattering element 165a of the scatterer support 165, the light that is incident on the tip is scattered by, refracted by, and/or reflected from the tip. As in other embodiments of this invention, some of the light from the light-scattering element 165a is directed toward and isolated by the lens 152 and the aperture stop 154. Like the micro-optical probe 10h shown in FIG. 17 and described above, when the light-scattering element 165a is at its highest position (at the tip of arrow 170a), the light scattered by, refracted by, and/or reflected from the light-scattering element 165a is transmitted via the lens 152 toward the bottom of the aperture stop 154—the tip of the arrow 172a. Likewise, when the light-scattering element 165a is at its lowest position (at the tip of arrow 170b), the light scattered by, refracted by, and/or reflected from the light-scattering element 165a is transmitted via the lens 152 toward the top of the aperture stop 154—the tip of arrow 172b. The light thus isolated by the lens 152 and the aperture stop 154, as the light-scattering element 165a is moved up and down, is collected by the light-measuring device 156 to measure the intensity distribution in the incident light beam 182.

Various embodiments of an optical probe formed in accordance with the present invention have been described. When suitably constructed, the space required for an optical probe formed in accordance with the present invention is on the order of the size of the light-scattering element used. Varying the size of the light-scattering element using various fabrication methods allows optical probes of various sizes to be constructed. As will be appreciated by those skilled in optics, the spatial resolution of the measured intensity distribution map can be freely adjusted by varying the size of the light-scattering element and, where a lens is used to isolate the scattering element, the size of the aperture stop. Because the incident light is scattered by, refracted by, and/or reflected from the light-scattering element, as opposed to being absorbed by it, and only the light thus scattered by, refracted by, and/or reflected from the light-scattering element is received by a light-measuring device, a probe formed in accordance with the present invention is-not susceptible to damage even when exposed in relatively strong optical fields. Further, an optical probe formed in accordance with the present invention can be used to accurately measure the intensity and/or intensity distribution of an incident light beam because such a probe isolates the light to be measured (i.e., the light scattered by, refracted by, and/or reflected from a light-scattering element) from the rest of the light.

While preferred embodiments of the invention have been illustrated and described, it will be appreciated that various changes can be made therein without departing from the spirit and scope of the invention as defined by the appended claims.

The embodiments of the invention in which an exclusive property or privilege is claimed are defined as follows:

1. An optical probe for measuring the intensity of a light beam, comprising:
   a substrate formed of nonlight-absorbing material;
   a light-scattering element included in the substrate, the light-scattering element having an index of refraction different from that of the substrate;
   an aperture stop for receiving the light scattered by, refracted by, and/or reflected from the light-scattering element, wherein the light-scattering element and the aperture stop are arranged in fixed relationship with respect to each other; and a light-measuring device for measuring the intensity of the light received by the aperture stop.

2. The optical probe of claim 1, wherein the substrate comprises material selected from a group consisting of transparent plastic and glass, and the light-scattering element comprises an air bubble trapped within the substrate.

3. The optical probe of claim 1, wherein the light-measuring device is selected from a group consisting of radiometric and spectro-radiometric devices.

4. The optical probe of claim 3, wherein the radiometric and spectro-radiometric devices include photodiodes, photomultipliers, spectrophotometers, and silicon detectors.

5. The optical probe of claim 1, wherein the aperture stop and the light-measuring device are integrally formed.

6. The optical probe of claim 1, further comprising a lens positioned between the light-scattering element and the aperture stop to receive the light scattered by, refracted by, and/or reflected from the light-scattering element and to transmit the light to the aperture stop.

7. The optical probe of claim 1 wherein the substrate comprises an optical waveguide.

8. The optical probe of claim 7, wherein the optical waveguide is in the form of a slab.

9. The optical probe of claim 7, wherein the optical waveguide is in the form of a tapered block including a tapering end and a nontapering end, the tapering end including the light-scattering element, and the nontapering end forming the lens.

10. The optical probe of claim 1, further including material selected from a group consisting of optical fibers and optical waveguides, wherein the aperture stop is located at one end of the material and the light-measuring device is located at the other end of the material.

11. The optical probe of claim 1, wherein the substrate is formed of a pair of blocks, each block including a slanted edge surface, the slanted edge surfaces of the blocks are adapted to complement each other to form the substrate when the two blocks are combined together, and the light-scattering element is deposited on one of the slanted edge surfaces.

12. An optical probe for measuring the intensity of a light beam, comprising:
    an elongated support having a tip;
    a light-scattering element associated with the tip of the elongated support;
    an aperture stop for receiving the light scattered by, refracted by, and/or reflected from the light-scattering element, wherein the light-scattering element and the aperture stop are arranged in controlled relationship with respect to each other; and
    a light-measuring device for measuring the intensity of the light received by the aperture stop.

13. The optical probe of claim 12, wherein the elongated support comprises a wire and the light-scattering element comprises glass.

14. The optical probe of claim 12, wherein the light-measuring device is selected from a group consisting of radiometric and spectro-radiometric devices.

15. The optical probe of claim 14, wherein the radiometric and spectroradiometric devices include photodiodes, photomultipliers, spectrophotometers, and silicon detectors.

16. The optical probe of claim 12, wherein the aperture stop and the light-measuring device are integrally formed.

17. The optical probe of claim 12, wherein the light-scattering element comprises the tip of the elongated support.

18. The optical probe of claim 12, further comprising a lens positioned between the light-scattering element and the aperture stop to receive the light scattered by, refracted by, and/or reflected from the light-scattering element and to transmit the light to the aperture stop.

19. The optical probe of claim 12 further comprising material selected from a group consisting of optical fibers and optical waveguides, wherein the aperture stop is located at one end of the material and the light-measuring device is located at the other end of the material.

20. The optical probe of claim 18, fabricated at least in part from micromachined components.

21. The optical probe of claim 20, wherein the lens comprises a graded refractive index rod lens.

22. The optical probe of claim 20, further comprising a one-dimensional microactuator including a platform, the platform being adapted to move one-dimensionally, the elongated support having the tip being associated with the platform so as to move one-dimensionally as the platform is moved one-dimensionally, wherein the aperture stop comprises a slit extending in the direction of the one-dimensional movement of the tip, and the tip, the lens, the slit, and the optical light-measuring device are in optical alignment as the tip is moved one-dimensionally.

23. The optical probe of claim 20, further comprising a three-dimensional microactuator including a platform, the platform being adapted to move three-dimensionally, the elongated support having the tip, the lens, and the aperture stop being associated with the platform so as to move three-dimensionally as the platform is moved three-dimensionally.

24. The optical probe of claim 20, further comprising a buckle bar actuator, the buckle bar actuator including the elongated support having the tip, the buckle bar actuator being adapted to move one-dimensionally to move the tip one-dimensionally, wherein the aperture stop comprises a slit extending in the direction of the one-dimensional movement of the tip, and the tip, the lens, the slit, and the light-measuring device are in optical alignment as the tip is moved one-dimensionally by the buckle bar actuator.

25. An optical probe for measuring the intensity of a light beam, comprising:
    a substrate sheet, comprising a plane enclosed by a periphery;
    a light-scattering element associated with the substrate sheet, the light-scattering element having an index of refraction different from that of the substrate sheet; and
    a light-measuring device for receiving the light scattered by, refracted by, and/or reflected from the light-scattering element and that is directed through the substrate sheet along the plane of the substrate sheet to exit the substrate sheet via the periphery, wherein the light-scattering element and the light-measuring device are arranged in controlled relationship with respect to each other.

26. The optical probe of claim 25, wherein the substrate sheet comprises glass.

27. The optical probe of claim 25, wherein the light-scattering element is applied on a surface of the substrate sheet.

28. The optical probe of claim 25, wherein the light-scattering element is enclosed within the substrate sheet.

29. The optical probe of claim 25, wherein the light-scattering element comprises a void.

30. The optical probe of claim 25 wherein the substrate sheet includes polymer dispersed liquid crystal including orthogonally arranged sets of first conductive strips and second conductive strips, and the light-scattering element comprises a volume sandwiched between a pair of selected first and second conductive strips, between which an electric field is created.

31. The optical probe of claim 25, wherein the substrate includes lead lanthanum zirconate titanate including orthogonally arranged sets of first conductive strips and second conductive strips, and the light-scattering element comprises a volume sandwiched between a pair of selected first and second conductive strips, between which an electric field is created.

32. The optical probe of claim 25, wherein the substrate includes a plurality of light-scattering markings that are defined radially surround the light-scattering element.

33. The optical probe of claim 25, fabricated at least in part from micromachined components.

34. The optical probe of claim 33, further comprising a microactuator adapted to move the light-scattering element.

* * * * *